US012807431B2

(12) United States Patent
Lovett et al.

(10) Patent No.: US 12,807,431 B2
(45) Date of Patent: Nov. 24, 2026

(54) ROBOTIC GRIPPER WITH SUPPORT STRUCTURE

(71) Applicant: Dexterity, Inc., Redwood City, CA (US)

(72) Inventors: Andrew Lovett, Burlingame, CA (US); Samir Menon, Atherton, CA (US); Robert Holmberg, Mountain View, CA (US); Jeesu Baek, San Mateo, CA (US); Andrew Bylard, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 604 days.

(21) Appl. No.: 18/222,289

(22) Filed: Jul. 14, 2023

(65) Prior Publication Data

US 2024/0017940 A1 Jan. 18, 2024

Related U.S. Application Data

(60) Provisional application No. 63/390,235, filed on Jul. 18, 2022.

(51) Int. Cl.
*B65G 47/91* (2006.01)
*B25J 15/06* (2006.01)

(52) U.S. Cl.
CPC .......... *B65G 47/91* (2013.01); *B25J 15/0683* (2013.01)

(58) Field of Classification Search
CPC ...... B65G 47/91; B65G 57/04; B25J 15/0014; B25J 15/0683; B25J 15/0616
See application file for complete search history.

(56) References Cited

U.S. PATENT DOCUMENTS

| | | | | | |
|---|---|---|---|---|---|
| 5,232,332 | A * | 8/1993 | Focke | B65G 61/00 | 414/744.8 |
| 6,652,014 | B2 * | 11/2003 | Schmalz | B25J 15/0616 | 414/737 |
| 8,162,362 | B2 * | 4/2012 | Braunschweiger | B65G 61/00 | 414/797 |
| 8,473,094 | B2 * | 6/2013 | Becker | B65G 47/918 | 414/796 |
| 9,498,887 | B1 * | 11/2016 | Zevenbergen | B25J 15/0052 | |
| 9,725,257 | B2 * | 8/2017 | Schenning | B65G 67/08 | |
| 10,226,865 | B2 * | 3/2019 | Nakayama | B25J 9/1669 | |

(Continued)

FOREIGN PATENT DOCUMENTS

| | | | |
|---|---|---|---|
| EP | 4011570 | 6/2022 | |
| EP | 3623324 | 9/2023 | |
| JP | 2019111615 A * | 7/2019 | B65G 47/91 |

OTHER PUBLICATIONS

Machine English Translation of JP-2019111615-A.*

(Continued)

*Primary Examiner* — Patrick H Mackey
(74) *Attorney, Agent, or Firm* — Van Pelt, Yi & James LLP

(57) ABSTRACT

A robotic end effector is disclosed. The robotic end effector includes (a) an end effector body having a top side and an operative side opposite the top side, (b) a pull force gripper disposed on the operative side of the end effector body, and (c) a first end effector support structure that is connected to the end effector body and extends from the end effector body in a direction that is orthogonal to the operative side of the end effector body.

23 Claims, 17 Drawing Sheets

(56) References Cited

U.S. PATENT DOCUMENTS

| | | | | |
|---|---|---|---|---|
| 10,549,928 | B1 | 2/2020 | Chavez | |
| 10,968,051 | B1 | 4/2021 | Tomasetta | |
| 11,772,269 | B2 * | 10/2023 | Sun | B25J 13/08 700/259 |
| 2011/0268548 | A1 * | 11/2011 | Doll | B25J 15/00 414/688 |
| 2019/0344447 | A1 * | 11/2019 | Wicks | B25J 15/0691 |
| 2020/0316787 | A1 | 10/2020 | Fujihara | |
| 2021/0179363 | A1 | 6/2021 | Hamilton | |
| 2022/0088800 | A1 * | 3/2022 | Patil | B25J 15/0014 |

OTHER PUBLICATIONS

Sileo et al. Vision based robot-to-robot object handover, Jan. 5, 2022, [online], retrieved from <URL: https://ieeexplore.ieee.org/documenU9659446>.

* cited by examiner

ROBOTIC GRIPPER WITH SUPPORT STRUCTURE

CROSS REFERENCE TO OTHER APPLICATIONS

This application claims priority to U.S. Provisional Patent Application No. 63/390,235 entitled ROBOTIC GRIPPER WITH SUPPORT STRUCTURE filed Jul. 18, 2022 which is incorporated herein by reference for all purposes.

BACKGROUND OF THE INVENTION

Robotic systems have been used to perform tasks such as stacking boxes or other items on a pallet; removing boxes or other objects from a stack, conveyor, container, or other source, and placing them on a pallet, conveyor, or other destination; perform singulation or sortation, such as by grasping items from an intake chute or other pick area and placing them on a conveyor or other destination; receive and unload shipments from a truck or other container; and receive and load items onto or into a truck or other container.

Robotic end effectors that use a pull force have been deployed, e.g., at the operative end of a robotic arm, to grasp boxes or other items using suction force, electrostatic adhesion, viscoelastic adhesion, so-called "draping" adhesion, magnetic force, etc. A suction-type end effector, for example, may terminate in a bank of silicone or other suction cups or in a foam rubber suction pad.

Typically, pull force type grippers have been used to grasp a box or other object from above. However, to stack or unstack boxes or other objects within a constrained space, such as in a truck or other container, or in a storeroom or other space with limited overhead space, a top grasp may not be practical.

A pull force type end effector may be used to grasp a box or other object from the side, but considerably more pulling force (e.g., suction) may need to be applied to perform such a grasp, which may not be practical, particularly for heavier objects. Also, in a side grip the item and/or pull force generating elements might deform, potentially resulting in damage to the item or loss of grasp.

BRIEF DESCRIPTION OF THE DRAWINGS

Various embodiments of the invention are disclosed in the following detailed description and the accompanying drawings.

DETAILED DESCRIPTION

Figure 1:
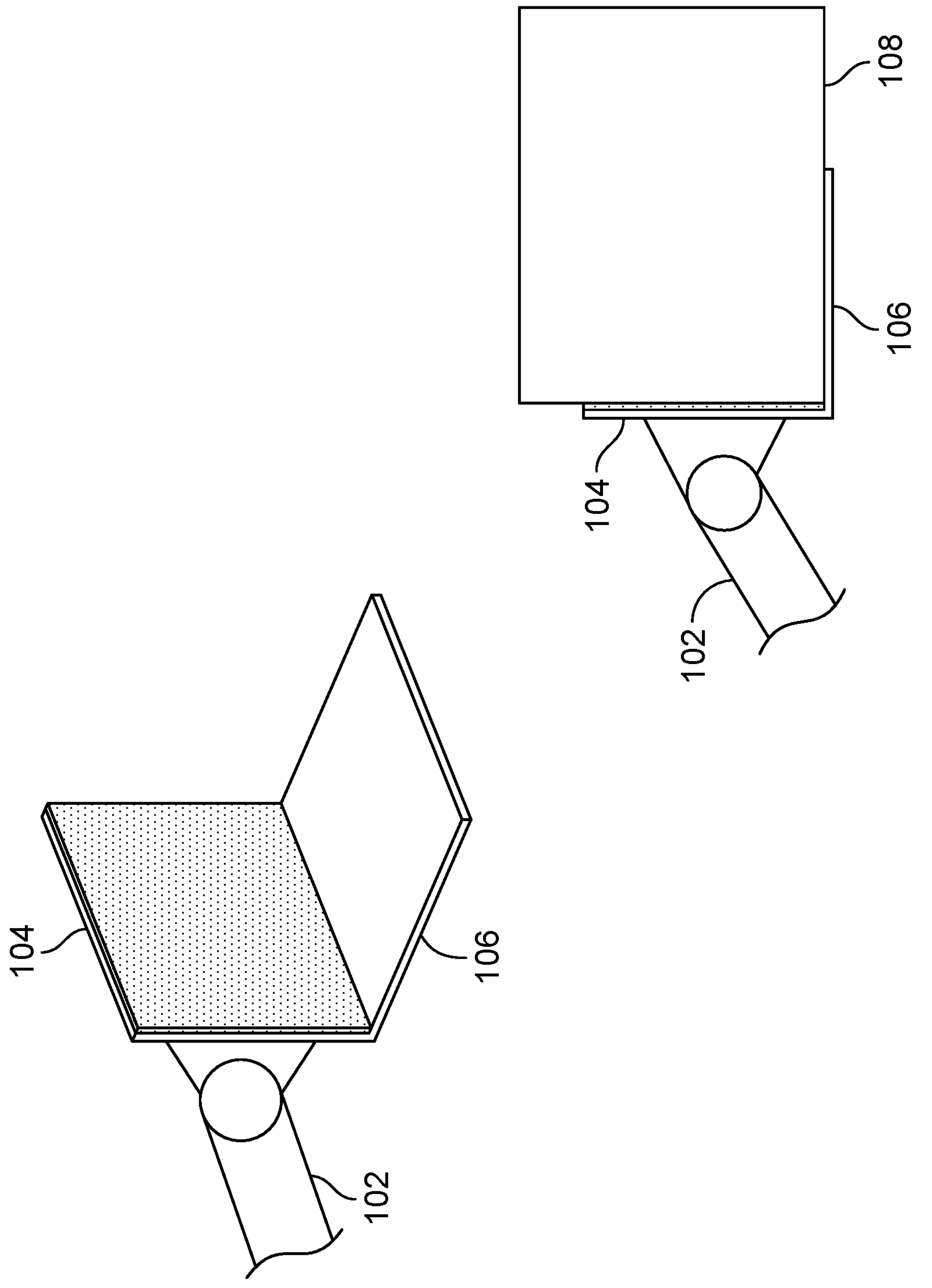
FIG. 1 is a diagram illustrating an embodiment of a robotic system to pick and place items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic end effector with an integrated support structure is disclosed. In various embodiments, a robotic end effector as disclosed herein includes one or more support structures adjacent to, e.g., along an edge of, a pull force type gripper element and each oriented in a plane substantially orthogonal to an operative plane of the pull force type gripper. In some embodiments, sometimes referred to herein as a "spatula" type end effector, the end effector includes a suction or other pull force type gripper oriented in a first operative plane and a support structure deployed in and/or deployable to/from a second plane that in various embodiments is substantially perpendicular to the first plane. For example, is some embodiments a robotic gripper as disclosed herein includes a substantially planar suction type gripper in a first plane and a set of one or more low friction metal or other plate, forks, rods, or other support structures in a second plane perpendicular to the first. As another example, in some embodiments, one or more support structures are movably connected to the end effector, and an actuator may change a positioning of the one or more support structures in accordance with a plan for grasping an item or a selected pick type. The end effector may further comprise a second support structure that is deployed in and/or deployable to/from a third plane that in various embodiments is substantially perpendicular to the first plane and the second plane.

In some embodiments, an end effector as disclosed herein includes a gripper other than a pull force gripper, such as a gripper comprising two or more opposing plates or "fingers" and an integrated support structure, such as a spatula or other structure to support an item from the bottom while the gripper grasps the item from the side.

In operation, in various embodiments, the robotic system uses a robotic arm on which a gripper as disclosed herein is disposed to orient the gripper into a position to grasp a box or other object. For example, the suction or other pull force-based gripper element may be oriented in a vertical position, with the support structure (e.g., "spatula") in a horizontal position, and the robotic arm may be used to slide the support structure under the box or other object until the suction portion is in position to engage a front (or other vertical) face of the box or other object. Suction or other pull force is applied to enable the box or other object to be pulled back and/or lifted from the stack or other starting location from which it was grasped. The support structure supports the box or other object from the bottom, making the grasp more secure with relatively less suction or other pull force applied (i.e., less suction or other pull force than otherwise might have been required to grasp the object securely from the side without the presence of the support structure). In various embodiments, the support structure comprises a low-friction support surface to ensure easy insertion of the support structure under the item during the grasping operation.

In various embodiments, the robotic arm may be used to reorient the gripper, once the box or other object has been grasped, e.g., to place the box or other object in a more secure position while the robotic arm is used to move the box or object through a trajectory to a destination location and/or the box or other object may be reoriented to facilitate placement at the destination location, such as to reach the box or other object up into a gap, e.g., at the top of a tall stack or a stack of any height with limited clearance overhead, or to place the box or other object into a corner or other extremity and/or constrained space, or to place the box in a corner position in a stack of boxes or other objects, etc.

Various embodiments provide a robotic end effector. The end effector comprises (a) an end effector body having an operative side, (b) a pull force gripper disposed on the operative side of the end effector body, and (c) a support structure that is connected to the end effector body and extends from the end effector body in a direction that is orthogonal to the operative side of the end effector body. The operative side may be opposite to a back side of the end effector.

Various embodiments provide a robotic end effector. The end effector comprises (a) an end effector body having an operative side, (b) a pull force gripper (e.g., a suction-based gripper) disposed on the operative side of the end effector body, and (c) a support structure that is connected to the end effector body and in an operative state extends from the end effector body in a direction that is orthogonal to the operative side of the end effector body to provide support to a bottom of an item grasped by the end effector (e.g., by the suction-based gripper).

Generally, the quickest and most efficient pick-type is the grasping the item using the pull force gripper on a top of the item (e.g., a top down suction pick type), for example, by engaging the item with the suction-based gripper at the top surface of the item. This pick type is illustrated as pick type 402 in FIG. 4. Further, in operation, this pick type is generally sufficient to implement a plan to move a majority of items (e.g., upwards of 85% of items can be moved using this pick type). A static support structure that extends orthogonally from the operative state may thus impede the use of an end effector comprising a pull force gripper and the support structure for moving items according to the top-down suction pick type. According to various embodiments, the end effector include the support structure that is movably mounted to the end effector body so that the support structure can be deployed to provide support to an item side when the item is grasped by the pull-type gripper and retracted or otherwise stowed away when the pick type to be implemented does not use the support structure (e.g., pick types 402, 404, and 406, etc.).

In connection with moving an item, the system determines placement for the item, such as a destination location, an orientation according to which an item is to be picked, etc. As an example, the system may determine the placement based on calling a solver (e.g., a physics engine) to select an optimal solution, for example, based at least in part on environmental and cost constraints. The optimal solution may be determined according to a scoring function, which may include weighted factors such as expected stability after placement, time to perform the move and placement, the presence of other objects/items in the workspace or around the destination location that may impede placement (e.g., a large or irregularly shaped box adjacent to the destination location, etc. As another example, the system may determine the placement based on one or more heuristics and a context (e.g., a current state of a stack of items or pallet, an item attribute, etc.).

In response to, or in conjunction with, determining an item placement, the system implements a solver engine to determine/select strategies for grasping the item and moving the item to the destination location subject to the constraints of the destination location and the orientation. Determining a strategy to grasp the item includes selecting a pick type to implement to grasp the item. The pick type may be determined as based on one or more (a) a destination location at which the item is to be placed, (b) an orientation in which the item is to be placed at the destination location, (c) an item attribute, (d) a current orientation of the item, (e) the presence of other items in the workspace that occlude or otherwise restrict the robotic arm's accessibility to grasp the item at certain locations, and/or (f) a trajectory along which the item is to be moved.

In some embodiments, the system determines whether the selected pick type includes use of the support structure. In response to determining that the selected pick type includes use of the support structure the system can deploy the support structure, either in advance of or during the pick operation. Deploying the support structure may include providing a control signal to an actuator that causes the support structure to move to, or maintain, the deployed position (e.g., a position in which the support structure is extended and in an operative state). Conversely, in response to determining that the selected pick type does not include use of the support structure, in connection with implementing the plan to move the item, the system controls the support structure to retract or otherwise stow the support structure in a manner that does not impede the end effector from grasping the item without the use of the support structure (e.g., by using only the suction-based gripper). The system controls to move the support structure by providing a control signal to an actuator that is configured to move the support structure (e.g., to a retracted or stowed state or to a deployed or operative state).

Various embodiments provide robotic system for moving items. The robotic system comprises a robotic arm comprising an end effector, a processor(s), and a memory. The end effector comprises (a) an end effector body having an operative side, (b) a pull force gripper disposed on the operative side of the end effector body, and (c) a support structure that is connected to the end effector body and extends from the end effector body in a direction that is orthogonal to the operative side of the end effector body. The processor(s) is configured to: (i) receive an indication of an item to be moved, (ii) determine a plan to move the item with the robotic arm, and (iii) cause the robotic arm to move the item according to the plan, the plan including grasping the item on a side surface with the pull force gripper and engaging a bottom surface of the item with the support structure.

In various embodiments, a robotic gripper as disclosed herein is configured to retract or otherwise stow a support structure and/or to move a suction or other operative portion of the gripper into a position that enables a suction-only (or other operative) grasp to be performed.

In some embodiments, a support structure as disclosed herein comprises a first suction or other pull force type gripper oriented in a first plane and a second suction or other pull force type gripper, i.e., at a 90 degree or other angle to a first suction type gripper.

In some embodiments, a gripper as disclosed herein comprises a suction or other pull force type gripper that conforms to the geometry of a box or other object, such as by bending or folder over one or more corners or edges of the box or other object.

FIG. 1 is a diagram illustrating an embodiment of a robotic system to pick and place items. In the example shown, a robotic arm 102 with a gripper (e.g., an end effector) comprises a suction (or other pull force) type gripper 104 attached to the robotic arm 102 and a low-friction support surface 106 (or "spatula") attached to the suction portion 104 along a bottom edge, as shown, to form a substantially 90-degree angle, as shown. As an example, the low-friction support surface 106 is fixedly connected to the end effector. As another example, the low-friction support surface 106 is movably mounted to the end effector to enable the low-friction support surface 106 to be retracted or otherwise re-positioned such as to allow for the robotic arm 102 to grasp an item using the suction type gripper 104 (e.g., without assistance from the low-friction support surface 106). In some embodiments, the support surface 106 or other support structure may form an angle other than 90 degrees with the suction portion 104. In the example shown, the suction type gripper is provided on an operative side of the end effector of robotic arm 102, and the low-friction support surface 106 extends from the end effector (e.g., the operative side of the end effector) in a direction orthogonal to the operative side surface or surface of the suction-type gripper 104. In the lower image, as shown, a box 108 has been grasped, e.g., by applying suction to a side surface of box 108 using suction portion 104 and positioning the support surface 106 under the box 108. In various embodiments, upon insertion of the support surface 106 under box 108, the robotic arm 102 is controlled to pull and/or lift the box 108. The support surface may be made of a material sufficiently rigid and/or strong to support the weight of the box 108.

Figure 2:
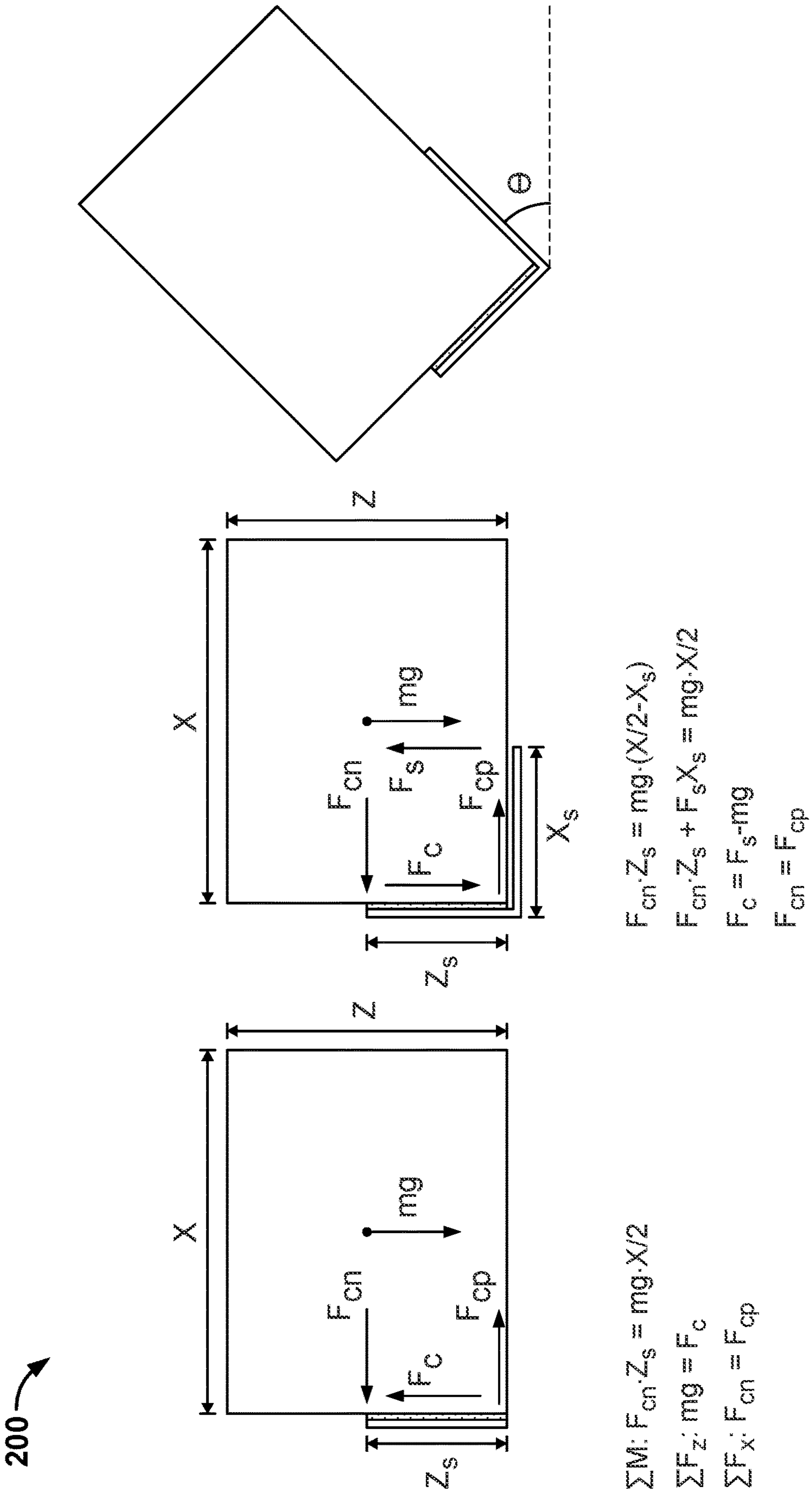
FIG. 2 is a diagram illustrating an example of forces interacting on an item when grasped with an end effector according to various embodiments.

FIG. 2 is a diagram illustrating an example of forces interacting on an item when grasped with an end effector according to various embodiments. In the example shown, the left side the force and moment equations for a side grasp by a suction-only gripper, i.e., one that has a suction gripper like suction portion 104 of FIG. 1 but no support structure such as supporting surface 106. In the middle image/column of FIG. 2, the forces and moments are illustrated and represented by equations for the case in which a gripper as disclosed herein is used, i.e., a gripper that includes a support structure to support a box or other object from the bottom, as shown in FIG. 2 (middle column).

With respect to a box grasped by a suction-based gripper without support from a support structure (as illustrated on the left side of FIG. 2), the sum of the moments acting on the box when grasped without a support structure surface is $F_{cn}*z_s=\frac{1}{2}x*(mg)$. The sum of the forces acting in the z-direction (e.g., vertically) is represented as $F_c=mg$. The sum of the forces acting in the x-direction (e.g., horizontally) is represented as $F_{cn}=F_{cp}$, which may be based on a suction force applied by the suction-based gripper.

With respect to a box grasped by a suction-based gripper with support from a support structure (as illustrated in the middle of FIG. 2), the sum of the moments acting on the box when grasped without a support structure surface is $F_{cn}*z_s=mg(\frac{1}{2}x-x_s)$, or simplified to $F_{cn}*z_s+F_s*x_s=\frac{1}{2}x*(mg)$. The sum of the forces acting in the z-direction (e.g., vertically) is represented as $F_c=F_s-mg$, where $F_s$ is the force acting on the box from the support structure. The sum of the forces acting in the x-direction (e.g., horizontally) is represented as $F_{cn}=F_{cp}$, which may be based on a suction force applied by the suction-based gripper. On the right side, the gripper is shown tilted back at an angle—a person of ordinary skill in the art would know how to adapt the equations of FIG. 2 (middle column) to reflect the tilt angle theta, as shown.

FIG. 2 shows that the suction force needed to support the weight (mg) of the box is less if a gripper as disclosed herein is used (as compared to a suction only gripper, gripping from the side, as shown on the left side of FIG. 2).

Figure 3:
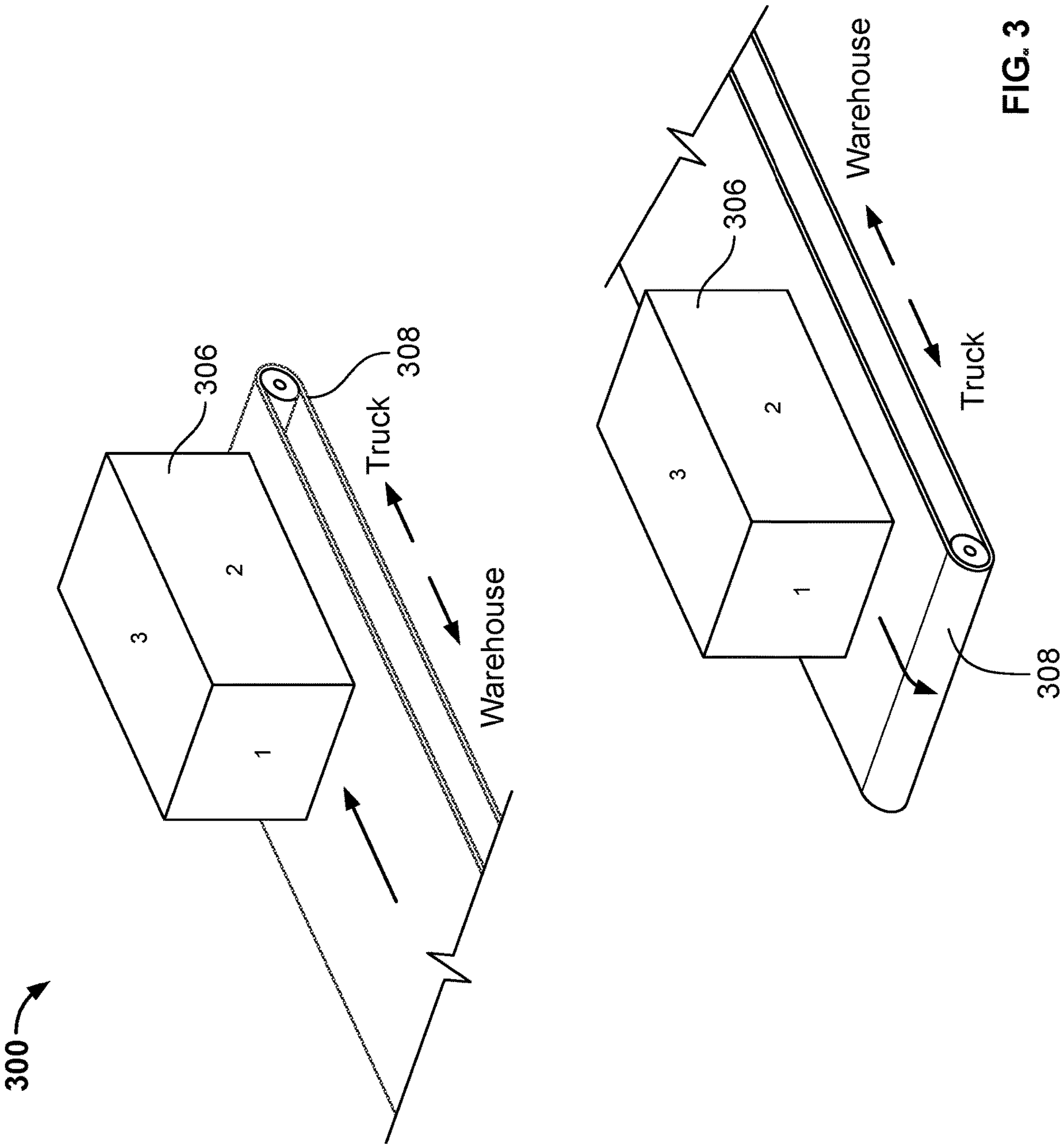
FIG. 3 is a diagram illustrating an example of labelling sides of an item according to various embodiments.

FIG. 3 is a diagram illustrating an example of labelling sides of an item according to various embodiments. In the example shown, on the left side of the figure, a workspace/scene 300 in which a box 306 is being moved along a conveyor 308, e.g., from a warehouse or other source to a truck or other destination, for example.

In various embodiments, the system comprises one or more sensors (e.g., a camera) and a control system (e.g., a device comprising one or more processors). For example, the system comprises one or more cameras positioned in workspace 300 to detect items in workspace 300 (e.g., items being carried along conveyor 308). The control system (e.g., a control computer that is configured to control a robotic arm to move items in workspace 300) uses the sensor data obtained by the one or more sensors in connection with moving items in the workspace. For example, the control system determines a plan for grasping and moving a particular item, and then causes the robotic arm to move the item according to the plan. The control system may process the sensor data, such as by performing image segmentation, in connection with identifying objects within the workspace 300. In response to detecting an item in the workspace 300, the system may label one or more sides of the item. For example, the system labels the visible sides according to a predefined labelling convention. Examples of the visible sides include a front side (e.g., a side labeled as "1" that faces the direction in which conveyor 308 moves item 306), a top side (e.g., a side labeled as "3" that faces upwards as item 306 travels on conveyor 308), and a left side adjacent to the front side and the top side (e.g., a side labeled as "2" that is visible to the camera). In some embodiments, the system corresponding labels the sides respectively opposing the top side, the left side, and the front side with the same label.

In some embodiments, the system uses the predefined labelling convention to label various sides of items detected in workspace 300 to ensure consistent labeling of references used in determining plans for moving items and strategies for grasping items.

A convention used in subsequent figures is established, specifically that the front and rear face of the box are referred to as sides "1", the left and right sides (orthogonal to the direction of travel along conveyor 308) are referred to as sides "2", and the top and bottom sides are referred to as sides "3".

Figure 4:
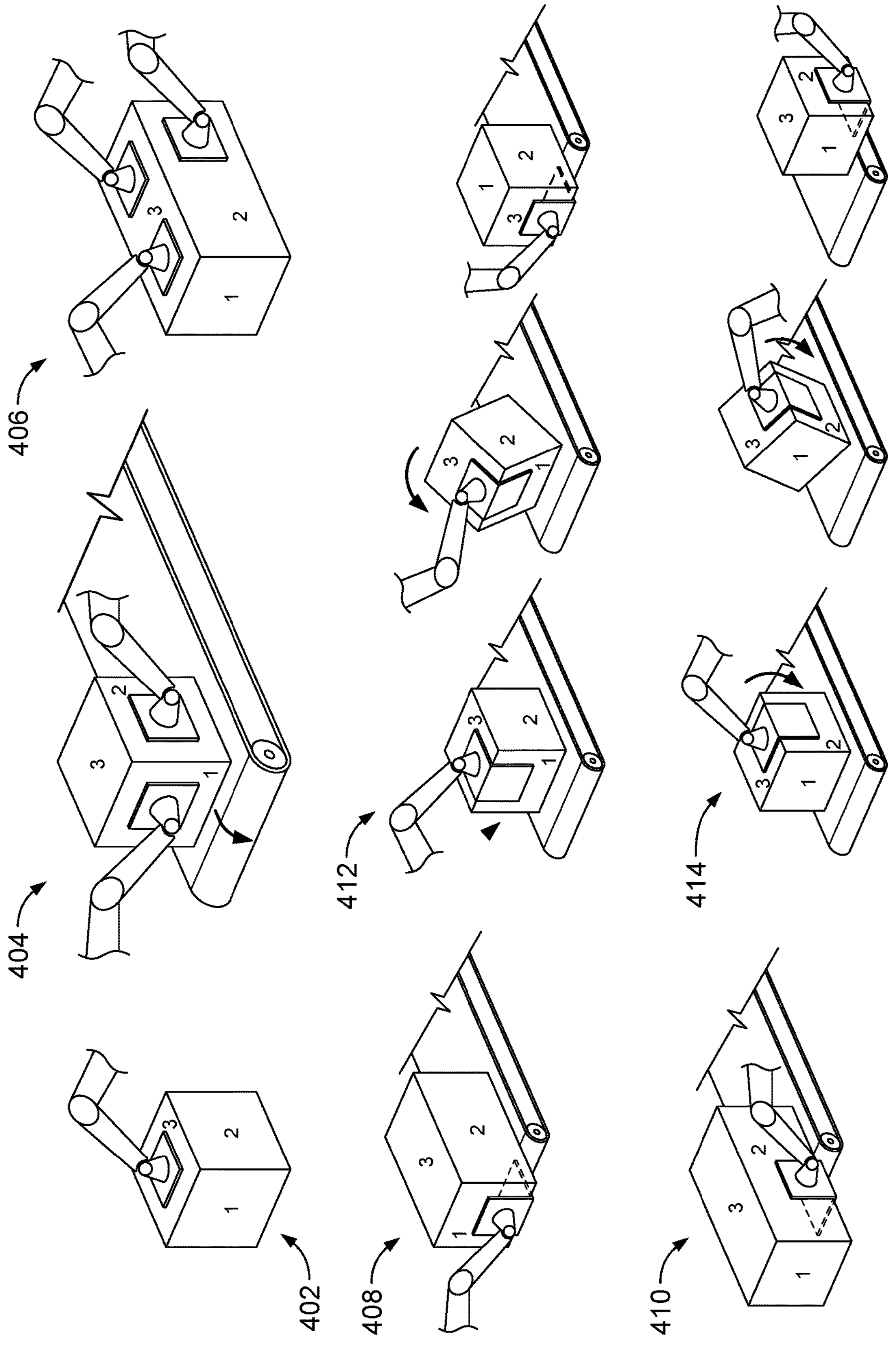
FIG. 4 is a diagram illustrating examples of pick types for picking an item according to various embodiments.

FIG. 4 is a diagram illustrating examples of pick types for picking an item according to various embodiments. A variety of grasp/pick types using a gripper as disclosed herein are illustrated. In some embodiments, the pick type is determined/selected based on one or more (a) a destination location at which the item is to be placed, (b) an orientation in which the item is to be placed at the destination location, (c) an item attribute, (d) a current orientation of the item, (e) the presence of other items in the workspace that occlude or otherwise restrict the robotic arm's accessibility to grasp the item at certain locations, and/or (f) a trajectory along which the item is to be moved. The system determines a placement for the item and based on the placement selects a pick type and associated strategy for grasping the item to move the item to the destination location.

Pick type 402 shows, for comparison purposes, a top-down suction-only pick using a conventional suction-type gripper. The top-down suction-only pick type is generally the simplest and most efficient pick type, which is effective for grasping items for a majority of item placements.

Pick type 404 shows collaborative use of two robotic arms, each equipped with a conventional suction-type gripper, in which each robotic arm/gripper is used to grasp the box from adjacent sides "1" and "2" (i.e., the front and a side). The system may control the two robotic arms to work cooperatively to move the item. For example, the system determines the strategy for controlling both robotic arms to grasp the item based on the plan to collaboratively use both robotic arms to move the item. Pick type 406 shows three robotic arms being used in collaboration, in this example to grasp a box that is particular long in one direction.

Pick type 408 shows a spatula-type gripper, as disclosed herein, being used to grasp a box from the front, as the box is moved forward off the conveyor. The spatula-type gripper may comprise a suction-type gripper (e.g., used to engage side 1) and a support structure(s) (e.g., used to engage the item at its the bottom). In some embodiments, the spatula or other support structure is used to receive and support the box as it leaves the conveyor until the front face is near enough to the suction portion of the gripper to be engaged using suction force. The system may coordinate the movement of the robotic arm comprising the end effector with the movement of the conveyor. For example, the system determines an expected timing that the item will arrive at the end of the conveyor (e.g., the pickup zone) and controls the robotic arm to position the end effector at the end of the conveyor to grasp the item as it leaves the conveyor. The coordination of controlling the robotic arm to grasp the item with the timing of the delivery of the item may be based on image data captured by a vision system (e.g., one or more sensors), or based on information obtained with respect to positioning of the conveyor, such as sensor data for the conveyor (e.g., a sensor that collects data pertaining to a motor driving the conveyor, etc.). Once the box has been grasped using suction and supported by the spatula, the robotic arm is used to move the box along a planned trajectory to an intended destination, at which it is placed. In some embodiments, the placement of the item includes setting the box in a destination location, e.g., on top of a stack of boxes, releasing the suction, and sliding the spatula out from under the box. The gripper may be angled, e.g., tilted forward, to facilitate sliding the box off of the spatula.

Pick type 410 shows the spatula being used to support the bottom of the box as it exits the conveyor and the suction portion being used to grasp the box from the side "2". Similar to pick type 408, in various embodiments the system coordinates control of the robotic arm with a timing according to which the item is expected to reach the pickup zone.

In pick type 412, the suction portion is used to engage the top surface (side "3") of the box with the spatula positioned along the front face, then the robotic arm is manipulated to rotate or "flip" the box, as shown, as it exits or is about to exit the conveyor, to an orientation in which the side "1" now faces down and is supported by the spatula, while the formally top side "3" is rotated to a position perpendicular to the ground within the grasp of the suction portion of the gripper. In some embodiments, the system coordinates the movement of the robotic arm with the movement of the item on the conveyor. For example, the system determines a location in the workspace at which item is to be engaged by the end effector (e.g., the suction portion) based on an attribute of the conveyor, such as the speed of the conveyor. Similarly, the system determines the location and/or timing for causing the end effector to rotate the item (e.g., a timing for causing the end effector to apply a rotational force to the item). The location and/or timing for engaging the item and/or rotating the item may be based at least in part on one or more of a conveyor attribute (e.g., conveyor speed), an item attribute (e.g., expected center of gravity, size or dimension, weight, etc.), an item location, and/or a destination location at which the item is to be moved.

Pick type 414 is similar to the pick type 412, except that the spatula portion of the grip is place alongside side "2" while the suction portion of the gripper is used to perform a top-down grasp onto side "3", and the box is "flipped" to the side, instead of forward as in pick type 412, into the position and orientation as shown in FIG. 4.

In some embodiments, the system determines to perform a re-orientation of an item, such as performing pick type 412 or pick type 414 in which the box is rotated or flipped, based on a difference between a current orientation and a placement orientation according to which the item is to be placed at the destination location. Further, the system may determine to perform a re-orientation based on a path/trajectory along which the robotic arm is to be moved to the destination location (e.g., the system determines to move the item in a certain orientation to provide more clearance from other objects in the workspace or to otherwise avoid collisions).

Figure 5:
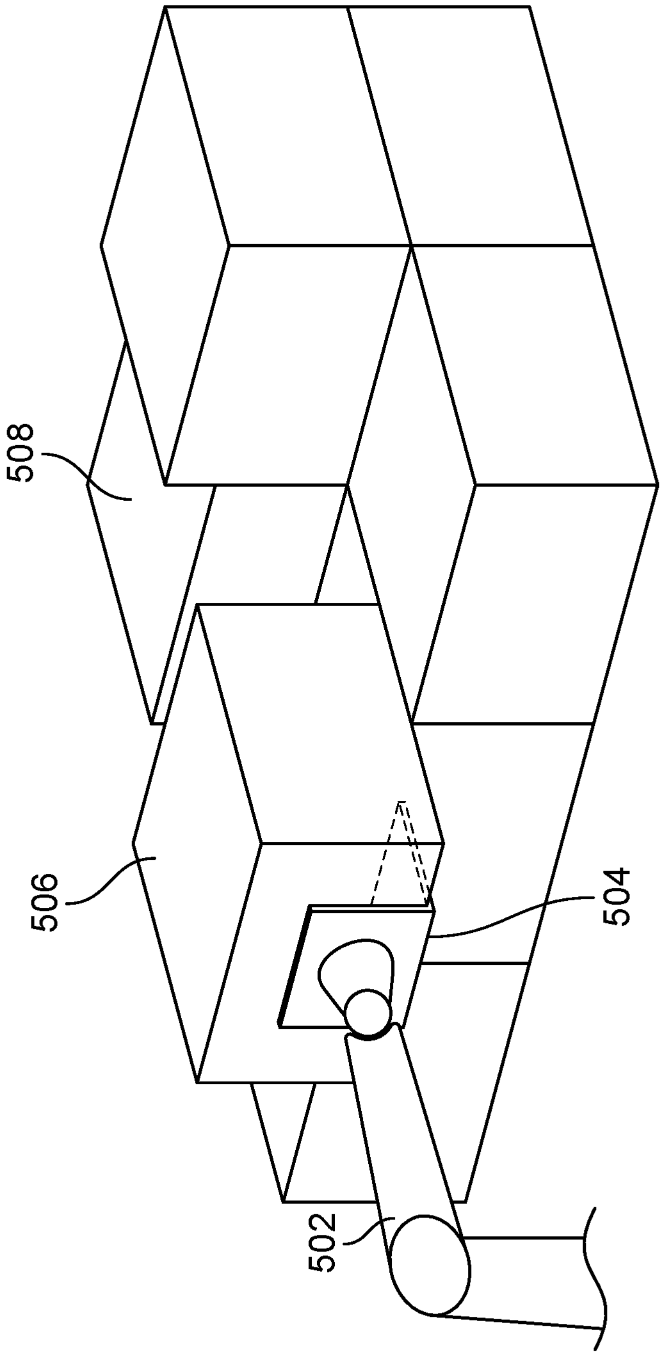
FIG. 5 is a diagram illustrating an example of placement of an item using an end effector according to various embodiments.

FIG. 5 is a diagram illustrating an example of placement of an item using an end effector according to various embodiments. In the example shown, a box in the grasp of a spatula-type gripper, as disclosed herein, is being placed in a destination location on a top layer of a stack of boxes, such as boxes that have been stacked on pallet or in a truck. In the example shown, a robotic arm 502 has a spatula-type gripper 504 disposed on an operative end of robotic arm 502. A box 506 is in the grasp of the gripper 504. Specifically, a suction portion of the gripper has been used to grasp the front (vertical) face of box 506, as shown, while a spatula portion of the gripper 504 supports the box 506 from below. In various embodiments, a robotic system as disclosed herein manipulates robotic arm 502 to position the box 506 in or very near an associated destination, e.g., aligned with and snugly adjacent to box 508 in the example shown. The system would then release the suction grip and use the robotic arm 502 to withdraw the gripper 504 from the box 506, sliding the spatula portion of gripper 504 out from under box 506 as gripper 504 is withdrawn. Although the example shown illustrates the sideways insertion of the box to the destination location with the bottom of the box 506 substantially parallel with a top surface of the box on which box 506 is to be placed, in some embodiments the robotic arm can be controlled to insert the box at an angle so that a distal end of box 506 first touches the surface on which box 508 is to be placed and the remaining part of the box 506 is lowered (e.g., by rotation of the item around the pivot line defined by the place at which the distal end of box 506 touches the top surface of the box beneath) to complete the placement. For example, the system implements a strategy for placing the item in which the item is rotated during placement.

Figure 6B:
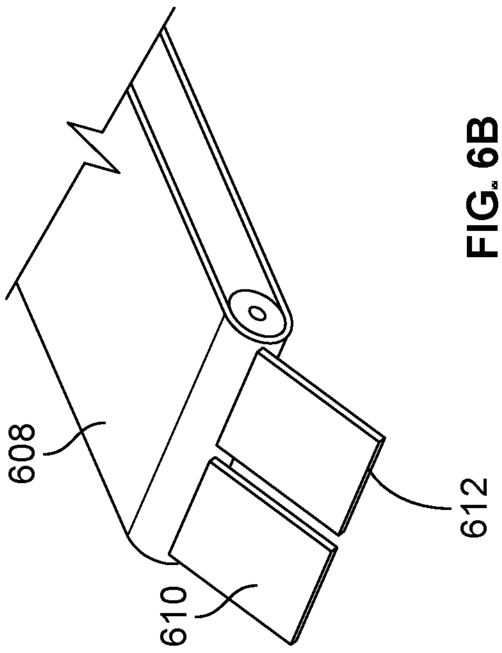
FIGS. 6A-6D illustrate an embodiment of a robotic system for grasping an item from a conveyance structure.
Figure 6D:
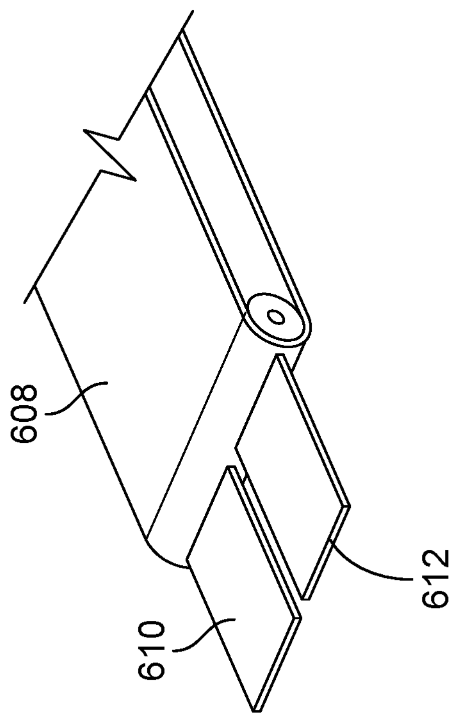
Figure 6A:
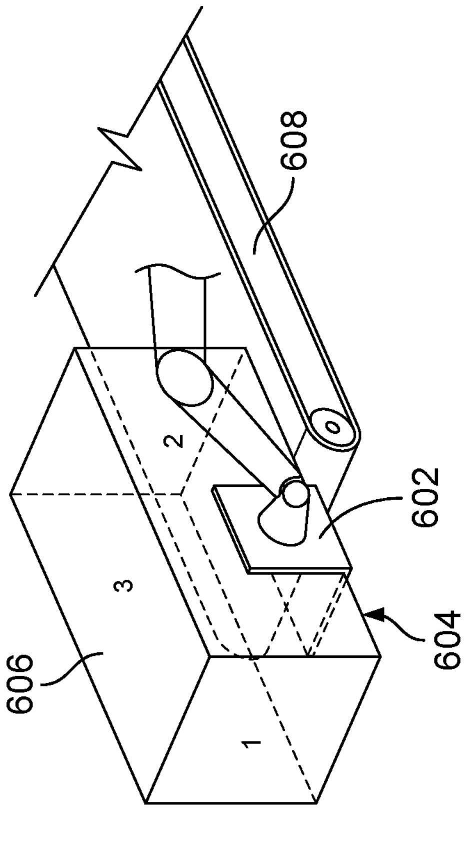

FIGS. 6A-6D illustrate an embodiment of a robotic system for grasping an item from a conveyance structure. As illustrated in FIG. 6A, a gripper as disclosed herein is being used to perform a side grasp. In the example shown, a gripper comprising suction portion 602 and spatula 604 is positioned as shown, with the suction portion 602 aligned with and adjacent to the side "2" of box 606, as box 606 exits conveyor 608, and spatula portion 604 positioned to support the box 606 from the bottom (side "3").

Figure 6C:
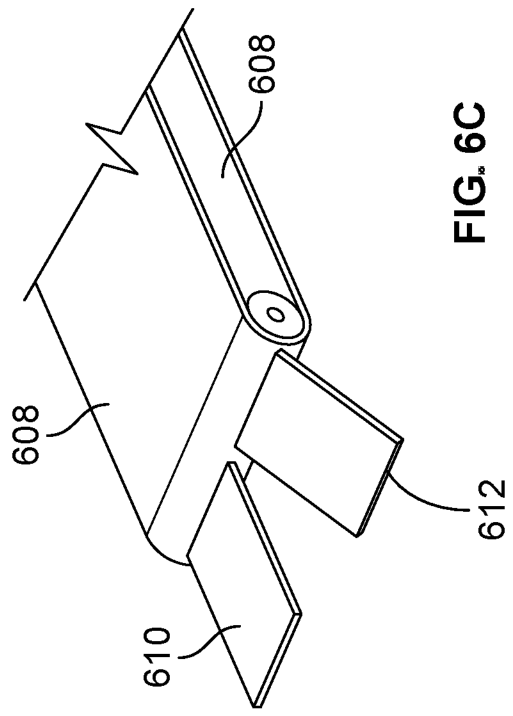

As illustrated in FIG. 6B-6D, in some embodiments, the conveyor 608 the includes independently retractable (e.g., by folding down) box support panels or flaps 610 and 612, as shown on the right side of FIG. 6. Alternatively, the system may more generally include the support panels in the event that the panels or flaps are provided by (e.g., supported and controlled) by a different module, such as an end table. In various embodiments, the support panel or flap 610 or 612 on the side on which the box will be grasped is retracted (e.g., folded down), under robotic control. For example, the support panel or flap is retracted to allow the robotic arm to engage the support structure (e.g., spatula-type gripper) on the bottom surface of the box supported by the other support panel or flap. As the box exits conveyor 608, e.g., in the state shown on the right side of FIG. 6, the panel or flap 610 supports one side of the box while the panel or flap 612 has been moved of the way, enabling the robotic arm and gripper 602, 604 to be used, e.g., as shown on the left side of FIG. 6, to grasp the box using suction from the side and the spatula to support the bottom (i.e., a portion of that part of the bottom that is not supported by panel or flap 610.

Although the example shown provides support panels or flaps 610 and 612 that are connected to the conveyor 608 and rotate around an axis substantially orthogonal to the direction in which the conveyor 608 moves boxes, various other techniques may be implemented to provide a movable panel, table, or flap that is movable to provide clearance for the end effector to grasp the item. For example, the system may implement one or more tables that can be raised and lowered to position the surface of the table(s) aligned with the conveyor 608 surface.

FIG. 6B illustrates both support flaps 610 612 configured in a retracted or stowed position in which they do are not required to provide support for an item being grasped by the robotic arm. FIG. 6C illustrates a support panel or flap 610 in a deployed position in which it is configured to provide support for an item. Support panel or flap 612 is disposed in a retracted position to enable an end effector to navigate a spatula (e.g., support-type gripper) on the end effector under the bottom of an item being at least partly supported by support panel or flap 610. FIG. 6D illustrates both support panels or flaps 610 and 612 configured in a deployed position to provide support for an item in the pickup zone as it is delivered by the end of the conveyor 608. As an example, both support panels or flaps 610 and 612 may be deployed in the event that the system determines the pick type does not require the end effector to support the item from the bottom (e.g., if the pick type is a type that uses only the suction-type gripper).

The one or more tables, surfaces, panels, flaps, etc. may be movable such as by actuation of a linear actuator, a hydraulic cylinder, a jackscrew, a lead screw, a linear motor, a pneumatic cylinder, a rigid chain actuator, a rigid belt actuator, a roller screw, a telescopic cylinder, a scissor mechanism, a rack and pinion, a lever, etc. Various other mechanisms may be implemented.

Figure 7A:
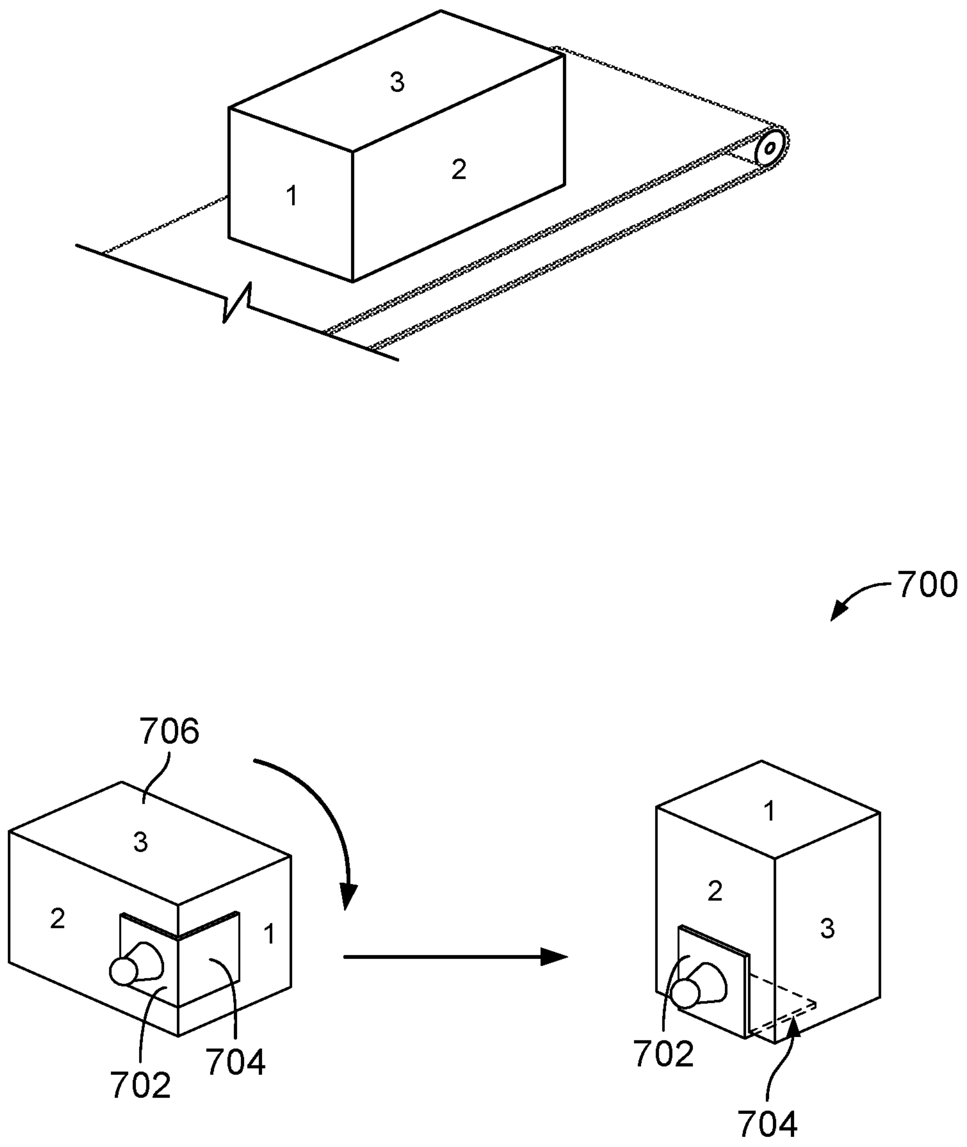
FIG. 7A is a diagram illustrating an example of item placement using an end effector according to various embodiments.
Figure 7B:
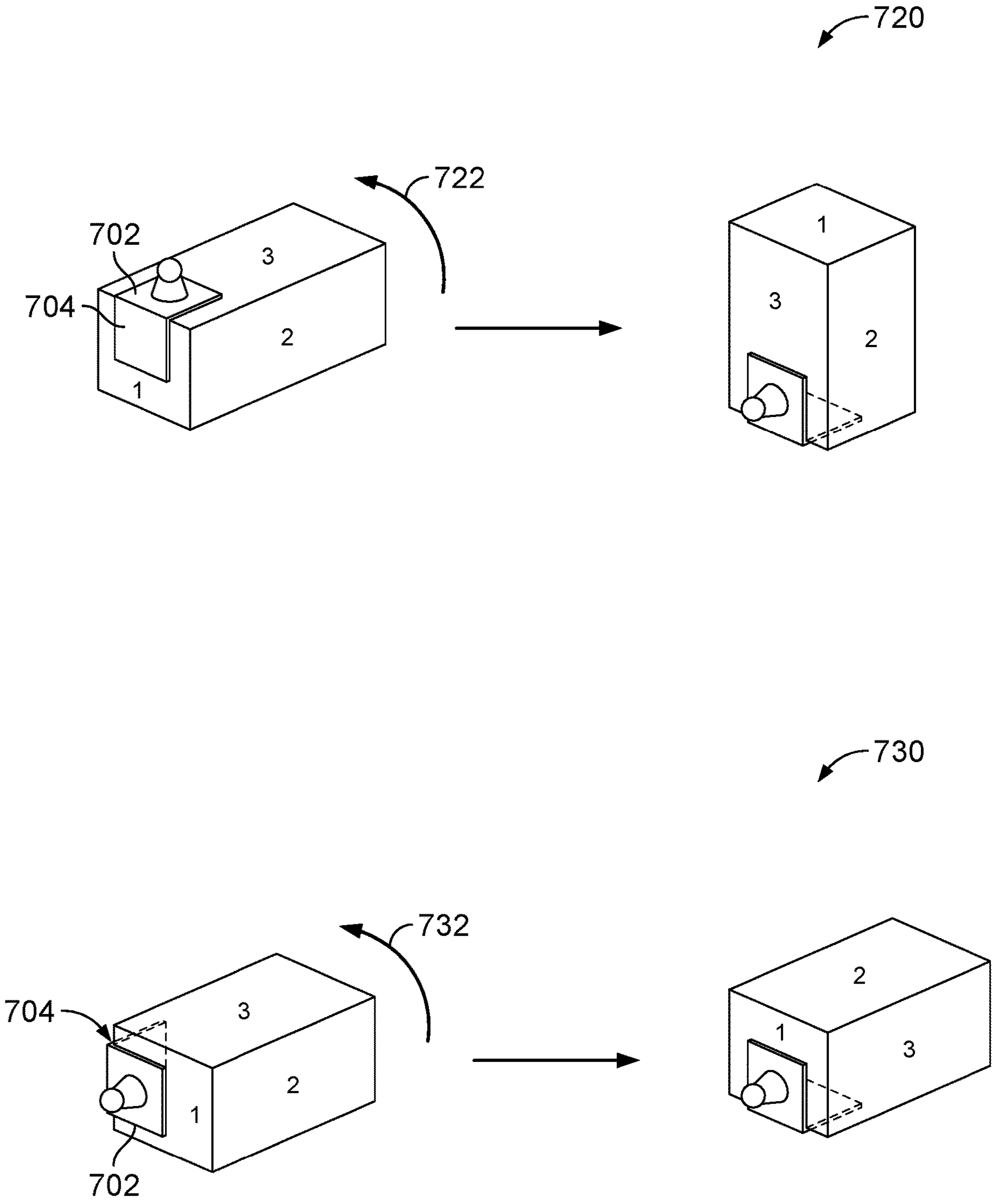
FIG. 7B is a diagram illustrating an example of item placement using an end effector according to various embodiments.
Figure 7C:
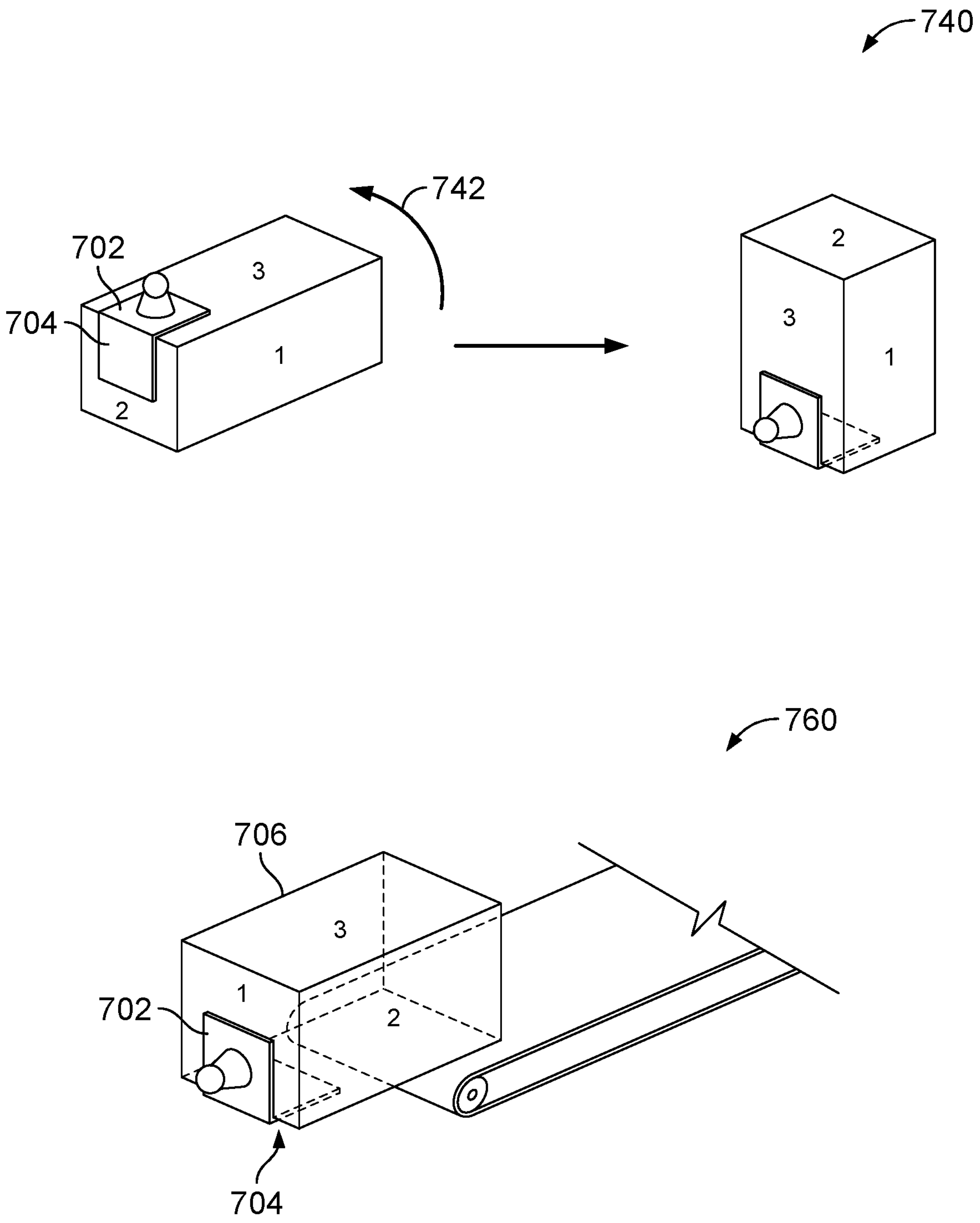
FIG. 7C is a diagram illustrating an example of item placement using an end effector according to various embodiments.

FIGS. 7A-7C are diagrams illustrating an example of item placement using an end effector according to various embodiments. For example, FIGS. 7A, 7B, and 7C illustrate strategies to pick (grasp) a box using a gripper as disclosed herein and reorient the gripper and box, as/if needed to facilitate placement.

The left side of FIG. 7A establishes conventions used in the following parts of FIGS. 7A, 7B, and 7C. On the right side of FIG. 7A, 700, an approach is illustrated in which a gripper as disclosed herein is used to grasp a box using suction portion 702 to grasp box 706 from the side while spatula 704 is positioned on the front face (side "1"). After the grasp, the gripper and box are rotated to the orientation shown on the right, to facilitate placement, e.g., as shown in FIG. 5.

FIG. 7B shows, on the left side, 720, a gripper as disclosed herein being used to grasp a box using suction on the top (side "3") and the spatula along the front face (side "1") and tilting the gripper and box back towards the robotic arm, as represented by arrow 722, to the orientation as shown just to the right of arrow 722. On the right side of FIG. 7B, 730, the suction portion 702 is used to grasp the box from the front (side "1") with the spatula placed along the side "2". Subsequently, the gripper and box are twisted (rotated), as represented by arrow 732, to the position as shown to the right of arrow 732.

FIG. 7C shows, on the left side, 740, a box being grasped from the side, using suction 702 at the top (side "3") and placing the spatula 704 along the side "2". The gripper is tilted back, as represented by arrow 742, to rotate the box into the position shown to the right of arrow 742, e.g., for placement as shown in FIG. 5.

The right side, 760, of FIG. 7C shown a front grasp in which suction 702 is used to grasp the front of box 706 (i.e., side "1") and the spatula 704 is position under the bottom of box 706 (i.e., side "3"). No flip or rotation is required because the box 706 is already supported from the bottom by spatula 704, and the box can be placed, e.g., as shown in FIG. 5, without being flipped or rotated.

In various embodiments, a robotic system as disclosed herein uses sensors, such as one or more of cameras or other image sensors, RF tag readers, optical code readers, and/or other sensors to determine attributes of a box or other object to be grasped. An object type or other identifier may be read or determined (e.g., by look up) based on information received from sensors. Object attributes or other meta data may be looked up and used to determine which of the grasping strategies of FIGS. 7A, 7B, and 7C may be available and/or more suitable or most likely to be successful, given the object attributes and the current state of the truck, pallet, stack, or other set of objects to which an object is to be added. For example, the weight of an object and/or how evenly the weight is distributed may be considered, or the fragility (or not) of one or more items inside a box and/or the strength of the packaging may be considered in determining whether to use strategies that require the box or other object to be rotated (flipped) subsequent to grasping the object.

In some embodiments, a box or other object may be grasped using a strategy as illustrated in FIGS. 7A, 7B, and 7C and then placed in a staging location or handed via an active hand-off to a second robot configured to reorient and/or otherwise grasp and place the object at a desired or required orientation.

In various embodiments, a spatula or other support structure comprising a robotic end effector as disclosed herein includes a mechanism to retract the spatula or other support structure to a stowed position, e.g., to facilitate using the end effector to grasp a box or other object in a suction-only mode of operation. In some embodiments, an end effector as disclosed herein includes a mechanism to retract/extend or otherwise move a suction portion of the end effector, relative to the spatula or other support structure. In an extended or other deployed position, the suction cups and/or pad of the suction portion of the end effector extend beyond or otherwise are in a position clear of interference from the spatula or other support structure, to facilitate a suction-only grasp. In a retracted or other second position, the spatula or other support structure is exposed and in position to be used to support or otherwise engage the bottom, side, or top of the box or other object.

Figure 8B:
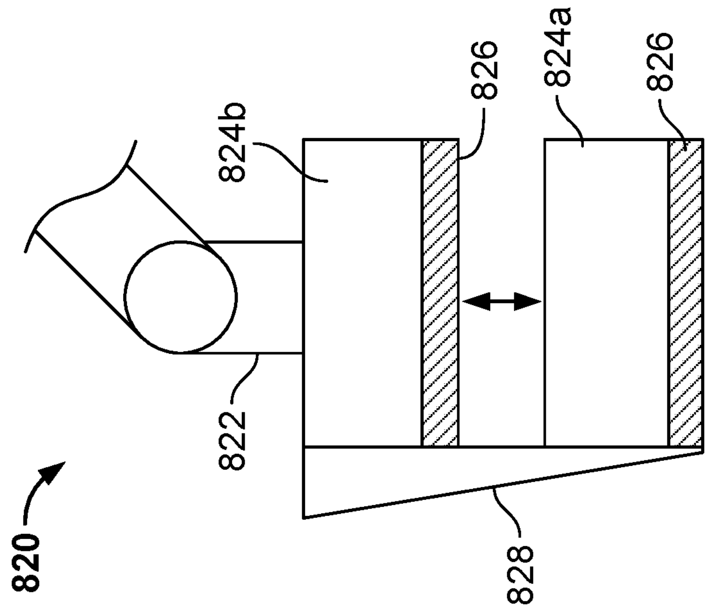
FIG. 8B illustrates an example of a robotic end effector comprising a suction portion that extends or retracts to stow or deploy a spatula-type support structure according to various embodiments.
Figure 8A:
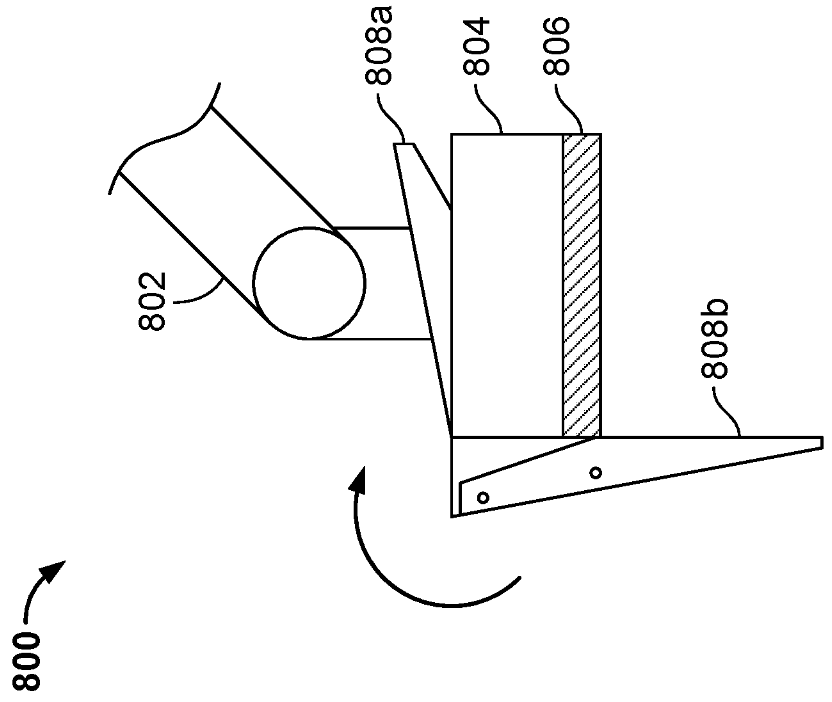
FIG. 8A illustrates an example of a robotic end effector comprising a retractable spatula-type support structure according to various embodiments.

FIG. 8A illustrates an example of a robotic end effector comprising a retractable spatula-type support structure. In the example 800 shown, a robotic arm 802 is equipped with an end effector comprising a body portion 804, foam-type suction pad 806, and spatula-type support structure 808, shown in this example in a first or stowed position 808*a*, in which the spatula 808 has been retracted to a stowed position on the top side of body portion 804, opposite and behind the foam-type suction pad 806, and spatula 808 also is shown in a second, deployed position 808*b*, in which the spatula 808 is position to engage the bottom, side, or top of a box or other object, depending on the grasp type/strategy being used, e.g., as shown in FIGS. 7A, 7B, and 7C.

FIG. 8B illustrates an example of a robotic end effector comprising a suction portion that extends or retracts to stow or deploy a spatula-type support structure. In the example 820 shown, a robotic arm 822 is equipped with an end effector comprising a body portion 824, foam-type suction pad 826, and spatula-type support structure 828. The end effector of FIG. 8B is shown in two positions, a first position 824*a* in which the body portion 824 and suction pad 826 are extended, e.g., along a guide associated with or comprising spatula 828. In the first position 824*a*, the foam suction pad is exposed and available for a suction-only grasp without risk of interference from the spatula 828. In a second, retracted position 824*b*, the body portion 824 and suction pad 826 are retracted, which exposes the spatula 828, making it available to engage the bottom, side, or top of a box or other object, depending on the grasp type/strategy being used, e.g., as shown in FIGS. 7A, 7B, and 7C. As an example, the body portion 824 and suction pad 826 may be moved using an actuation mechanism, such as a hydraulic/pneumatic piston, etc.

Figure 8C:
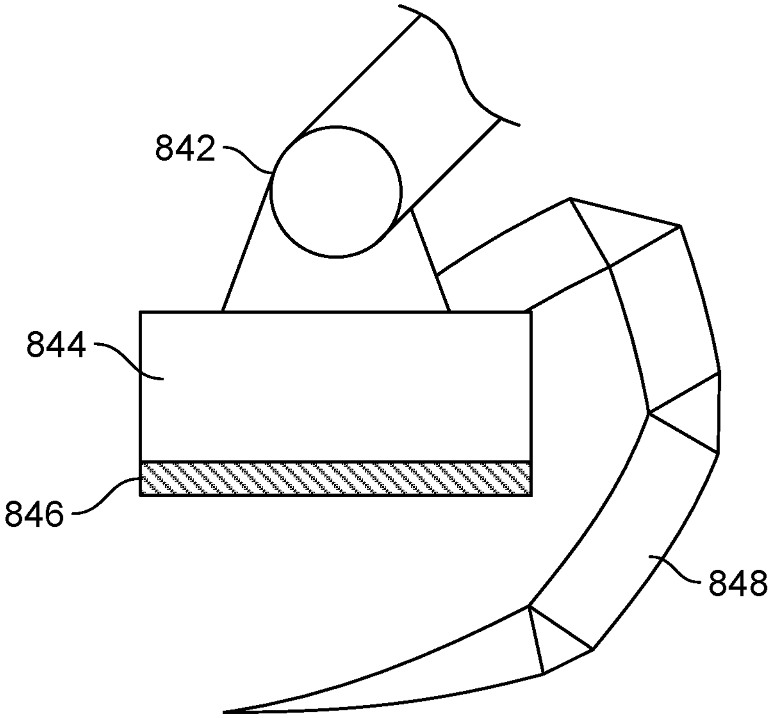
FIG. 8C illustrates an example of a robotic end effector comprising a retractable spatula-type support structure according to various embodiments.

FIG. 8C illustrates an example of a robotic end effector comprising a retractable spatula-type support structure. In the example shown, a robotic arm 842 is equipped with an end effector comprising a body portion 844, foam-type suction pad 846, and articulated spatula-type support structure 848. In various embodiments, spatula 848 is configured to be retracted or extended, e.g., by a cable and pulley or other drive mechanism. In a retracted mode, the spatula 848 is pulled up and out of the way, facilitating a suction-only grasp. In a deployed mode, the spatula 848 is extended down and, in some cases, may be curled under the body portion 844 and suction pad 846, e.g., as shown in FIG. 8C. In some embodiments, an end effector of the type shown in FIG. 8C may be used to grasp a box or other object from the top, using suction pad 846, while tucking the spatula 848 around and below the bottom of the box or other object, for support.

The articulated spatula-type support structure provides a more flexible end effector that can accommodate a variety of shapes and sizes of items.

In some embodiments, a robotic end effector comprises a plurality of banks of suction cups (or plurality of suction surfaces) that are respectively disposed on different substrates/end effector body components that are movable at least in relation to adjacent substrates/end effector body components. The system may control the end effector to move the substrates or body components to configure the various substrates or body components to grasp different areas/surfaces of an item. For example, moving the substrates or body components enables the end effector to better conform to the shape and/or size of the item.

Figure 9:
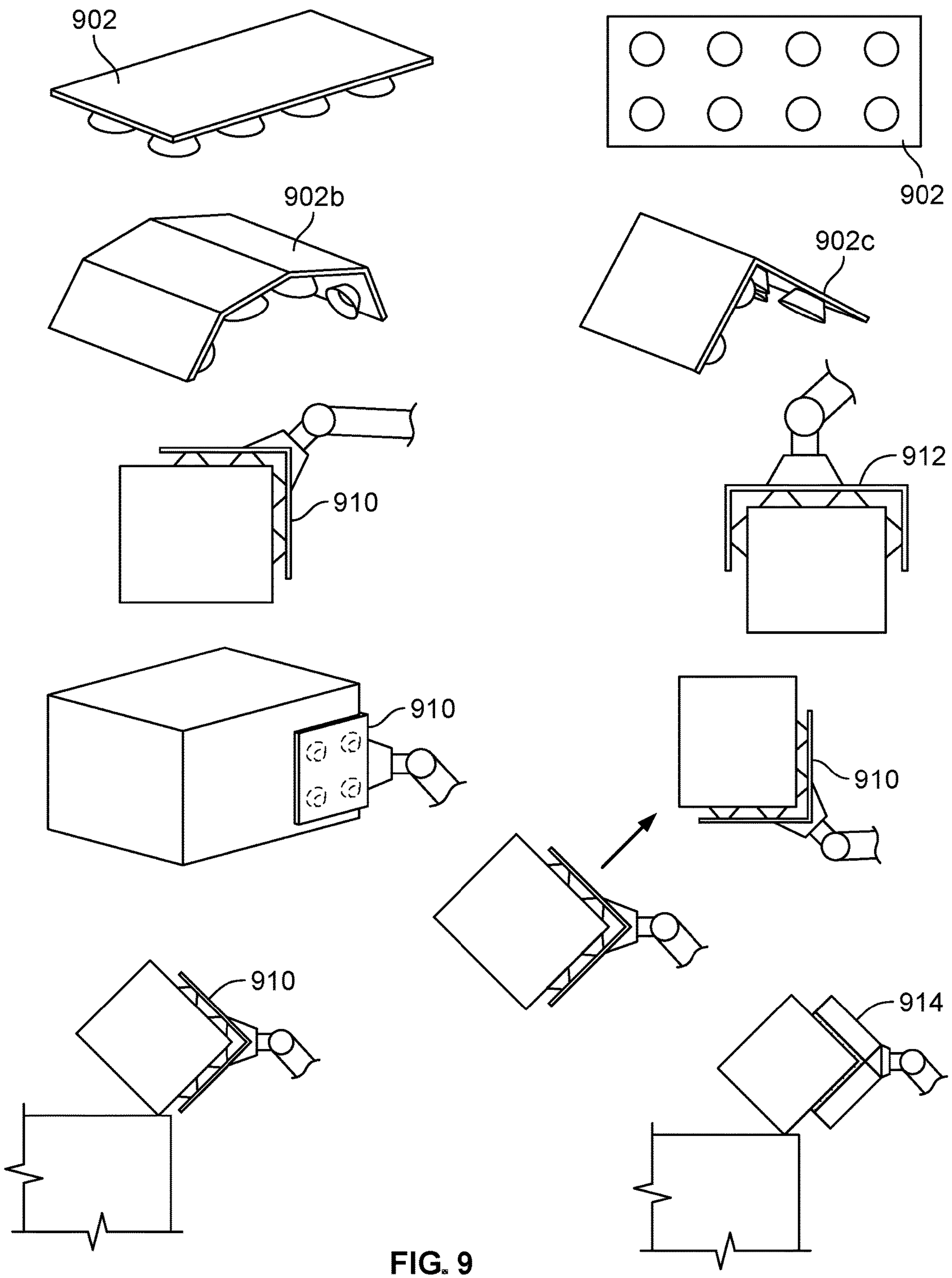
FIG. 9 illustrates various embodiments of robotic end effectors.

FIG. 9 illustrates various embodiments of robotic end effectors. In the images at the top of FIG. 9, end effector 902 is shown in a first configuration or mode of operation, in which a bank of eight suction cups, arranged in two rows, as shown, are substantially in a same plane. In various embodiments, e.g., as shown in examples 902*b* and 902*c*, the substrate or base on which the suction cups are mounted bends or folds or otherwise conforms to a shape of a box or other object to be grasped. For example, in the configuration 902*b*, each pair of cups is mounted on an independently orientable substrate connected via a hinge or other bendable connector structure to one or two adjacent segment. In the configuration 902*b*, the end effector 902 may be wrapped around one or more corners or other features of a box or other object to be grasped. In the configuration 902*c*, the end effector 902 includes (or has exercised) only one hinged, which divides the end effector into two panels of four cups each. In the configuration 902*c*, for example, the end effector 902 may be used to grasp a box from the top and side, or from two orthogonal and adjacent sides, such as the grasp example 910. Grasp example 912 shows the end effector, such as one having configuration 902*b*, using suction to grasp simultaneously from the top and two opposite sides, by wrapping around the top and sides as shown.

As shown in the image fourth from the top on the left-hand side of FIG. 9, the grasp example 910 may enable side placement of a heavier box or other object. Grasping a heavy box from the side with a single set of suction cups or pads may not be secure. The shear forces on the cups, for example, may cause the cups to collapse or otherwise deforming, resulting potentially in a loss of suction, resulting in the box being dropped. Using grasp example 910 may enable twice as many (or at least additional) cups to be used to engage the box with suction, enabling heavier boxes to be held from the side, which may facilitate placements that would not be possible using a more secure top grasp, e.g., due to limited overhead clearance or other constraints. As shown in the image fourth from top on the right side of FIG. 9, the grasp example 910 may also enable more secure and consistent suction through a range of motion and position or orientations, e.g., the rotation or flip maneuvers as illustrated in FIGS. 7A, 7B, and 7C. In the bottom image of FIG. 9, on the left-hand side, the grasp example 910 is shown being used to push a box onto a high shelf or stack, e.g., by setting the box on a corner, as shown, and using the end effector to allow the box to tip (to the left, or "forward" from the perspective of the box) and settle into position. Finally, the bottommost right image of FIG. 9 shows a similar scenario using an end effector 914 with a foam-type suction pad.

Figure 10:
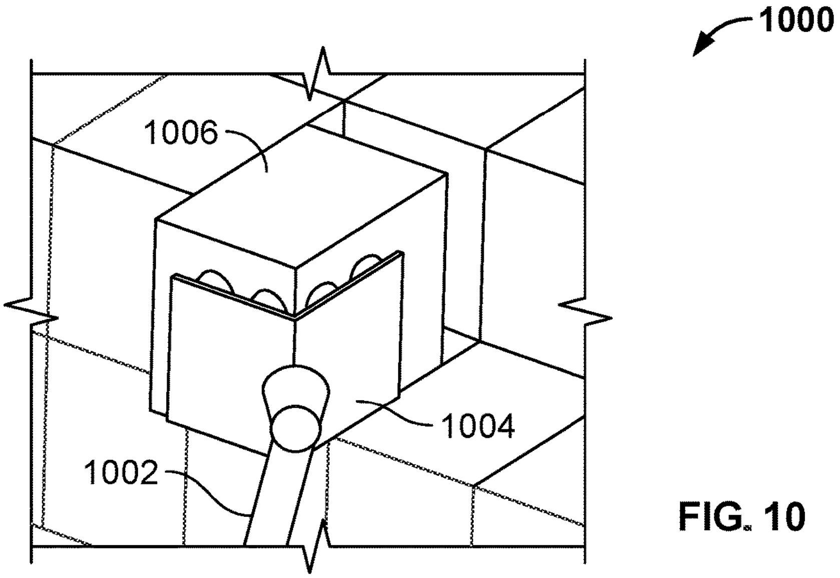
FIG. 10 illustrates an example of item placement using an end effector according to various embodiments.

FIG. 10 illustrates an example of item placement using an end effector according to various embodiments. As illustrated, workspace 1000 comprises a robotic arm 1002 terminating in an end effector 1004 is being used to perform a corner or side placement of box 1006. In the example shown, the two orthogonally oriented suction portions of the end effector 1004 enable the box 1006 to be grasped and placed more securely, using the side/corner grasp as shown. The system may determine a strategy for placing box 1006, including determining an orientation of the box 1006 and/or end effector 1004 during placement. In the example shown, the system performs the placement according to a strategy in which the end effector 1004 grasps the box 1006 on the front face and the right-side face, to ensure the end effector 1004 can be more easily removed when completing the placement (e.g., because the stack of boxes does not include any boxes adjacent to a side being grasped by the end effector 1004.

Figure 11A:
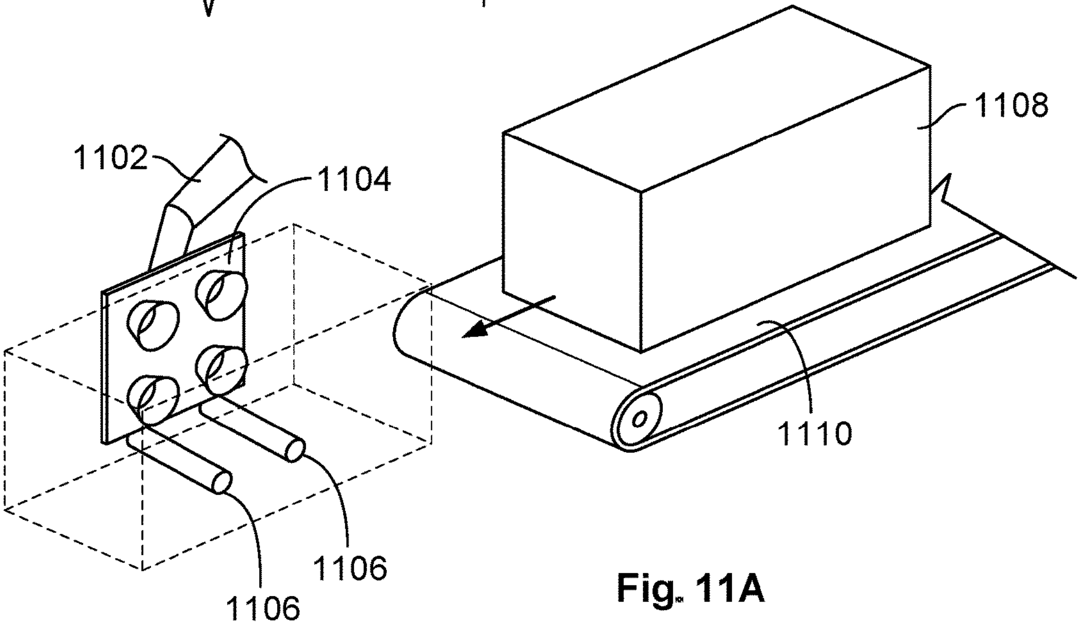
FIG. 11A illustrates an example of grasping an item with an end effector according to various embodiments.

FIG. 11A illustrates an example of grasping an item with an end effector according to various embodiments. As illustrated, a robotic arm 1102 with an end effector includes a suction portion 1104 and a plurality of support structures, such as support rods 1106. As shown, the end effector is positioned to receive and grasp box 1108 from the side, using suction portion 1104 while supporting the box 1108 from the bottom using support rods 1106, as the box 1108 exits the end of conveyor 1110.

In some embodiments, the end effector comprises a plurality of support structures that can be independently controlled to move their respective positions. The plurality of support structures may be re-configured to change a support provided to an item grasped by end effector 1104, such as to widen the support, etc. Additionally, or alternatively, the plurality of support structures may be moved to facilitate the grasping of the item using only the suction-based gripper (e.g., without the support structure supporting the bottom of the item), such as pick type 402. Each of the plurality of support structures may be controlled/re-configured independent from other support structures, or different subsets of the plurality of support structure may be controlled/re-configured independent of another subset of support structures.

Reconfiguring the positioning of one or more support structures may include one or more of (I) translating a support structure along a plane that is orthogonal to a surface of the operative side of the suction-type gripper on end effector 1104 to widen a support for the bottom of an item being grasped, (ii) pivoting/rotating a support structure around an axis substantially parallel with a surface of the operative side of the suction-type gripper on end effector 1104, (iii) tiling the support structure up or down to increase or decrease an angle formed between the support structure and the surface of the operative side of the suction-type gripper on end effector 1104.

For example, each of the plurality of support structures may be independently movable by actuating an actuating mechanism(s) that controls the support structure(s) positioning.

Figure 11B:
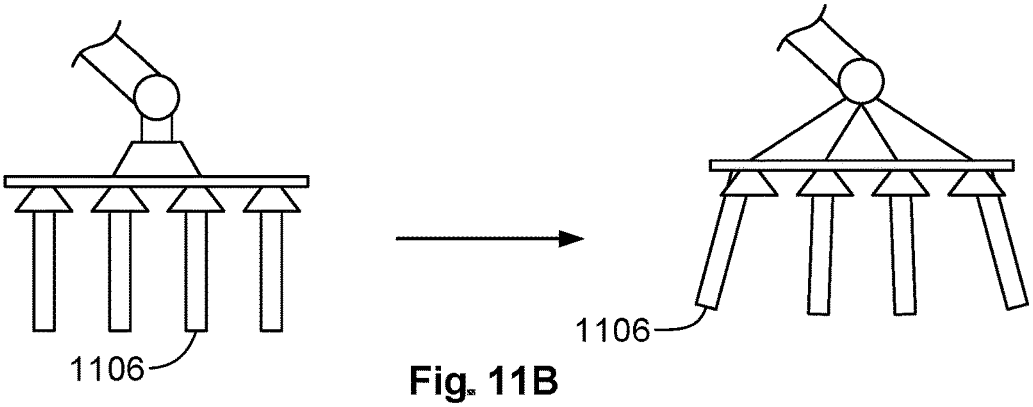
FIG. 11B illustrates an example of controlling an end effector to change a position of support structures according to various embodiments.

FIG. 11B illustrates an example of controlling an end effector to change a position of support structures according to various embodiments. As illustrated, the support rods 1106 may be retracted or expanded, such as in response to a control signal that controls an actuator configured to move one or more of the support rods 1106. For example, the support rods 1106 may be retracted fully and out of the way to facilitate grasps by suction only. Alternatively, the rods support 1106 may be fanned out, as shown in FIG. 11B, to support a wider (or longer or taller) box. In some embodiments, the rods may have a geared relationship to each other, such that they open and close together, like fingers of a hand fanning out or closing in.

Figure 12:
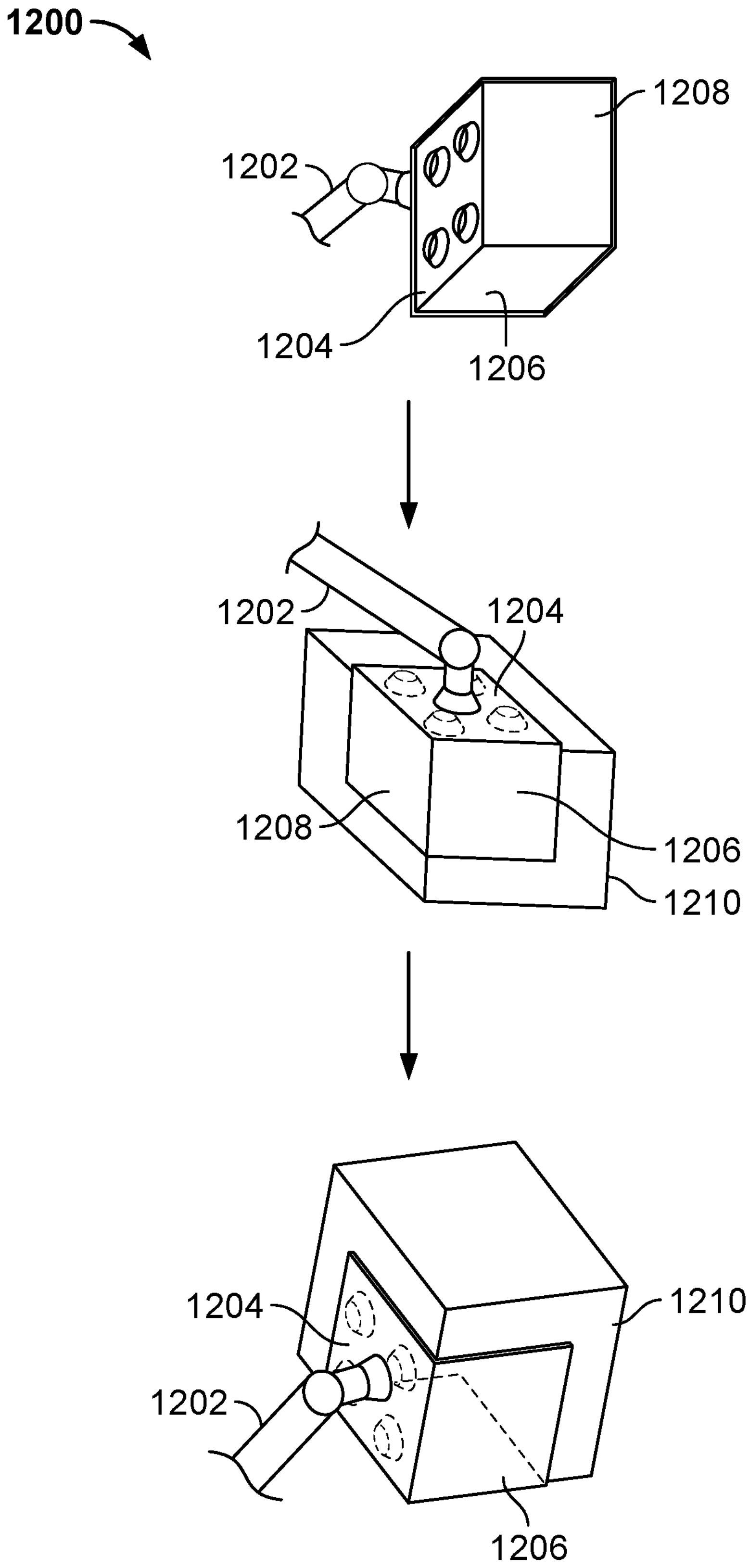
FIG. 12 illustrates a robotic end effector with two adjacent and mutually orthogonal support structures according to various embodiments.

FIG. 12 illustrates a robotic end effector with two adjacent and mutually orthogonal support structures. In the example shown, end effector 1200 disposed on robotic arm 1202 includes a suction (or other pull force) type gripper 1204 oriented in a first plane (a vertical plane, as shown in FIG. 12), a first support structure 1206 attached to a bottom edge of the gripper 1204, as shown, oriented in a second plane orthogonal to the first plane (i.e., a horizontal plane as shown), and a second support structure 1208 attached to a side edge of the gripper 1204 and an adjacent side edge for the first support structure 1206, and oriented in a third plane that is orthogonal to the first plane and the second plane. The arrangement of gripper 1204, first support structure 1206, and second support structure 1208 enables an item to be grasped using gripper 1204 and cradled (e.g., supported) using one or both of first support structure 1206 and second support structure 1208, e.g., as the end effector 1200 and item 1210 in its grasped are rotated into different postures for translation and/or placement, e.g., as shown in the lower two images of FIG. 12.

The corner/cradle grasp as shown in FIG. 12 may enable the item 1210 to be picked from the ground or another relatively lower position and placed on a high shelf or atop a tall stack of items, and/or to be snugged into place by using one or more of the gripper 1204, first support structure 1206, and second support structure 1208 to push the item into position.

Figure 13A:
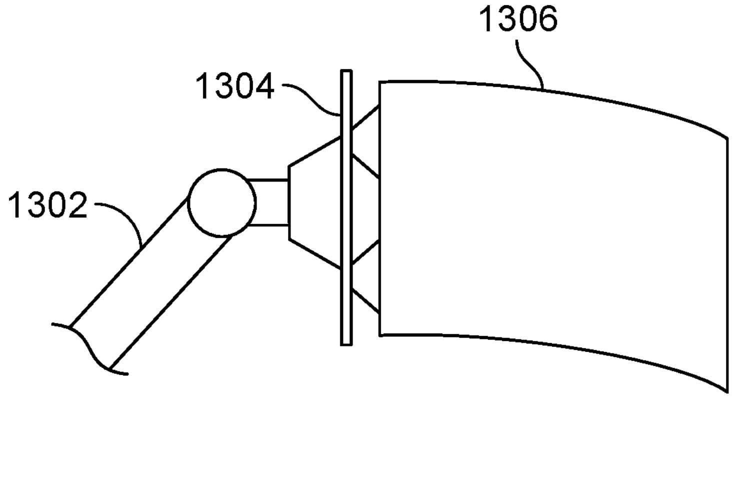
FIGS. 13A and 13B illustrate an example of ways in which a robotic end effector as disclosed herein may be used to minimize or avoid deformation of an item and/or suction cups or other operative elements of the gripper.
Figure 13B:
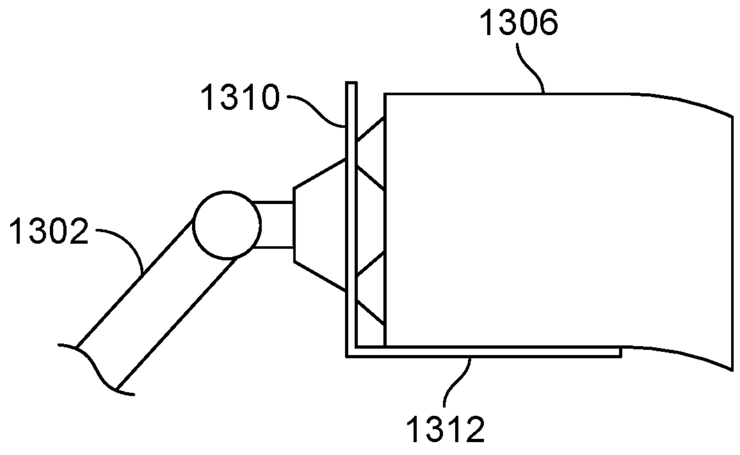

FIGS. 13A and 13B illustrate an example of ways in which a robotic end effector as disclosed herein may be used to minimize or avoid deformation of an item and/or suction cups or other operative elements of the gripper. In the example shown, the suction type gripper 1304 disposed on robotic arm 1302 is shown to have a box 1306 in its grasp. The box 1306 sags, resulting in substantial displacement along the y-axis (up/down) at the end furthest away from the gripper 1304. Such sagging could result in a collision as the item is moved through a workspace. Similarly, the suction cups comprising gripper 1304 may deform, potentially resulting in further sagging and/or a loss of vacuum/seal.

By contrast, the end effector shown in FIG. 13B includes a suction gripper portion 1310 and an integrated support structure 1312. As shown, the support structure 1312 supports the box 1306 from the bottom, significantly reducing sagging/deformation of the box 1306 and/or the suction cups of gripper 1310.

While suction-type grippers are described in connection with various embodiments disclosed herein, in various embodiments any pull force type gripper may be used. In some embodiments, a gripper other than a pull force gripper may be used in combination with a support structure as disclosed herein.

In various embodiments, techniques and structures disclosed herein may be used to enable heavier boxes and other objects to be grasped, moved, and placed more securely and with greater flexibility and reach.

Although the foregoing example is discussed in the context of a system palletizing a set of items on one or more pallets, the robotic system can also be used in connection with depalletizing a set of items from one or more pallets. Further, the end effector disclosed herein may be implemented in connection with other robotic operations, such as singulating items in a singulation system, or kitting items in a kitting system.

Figure 14:
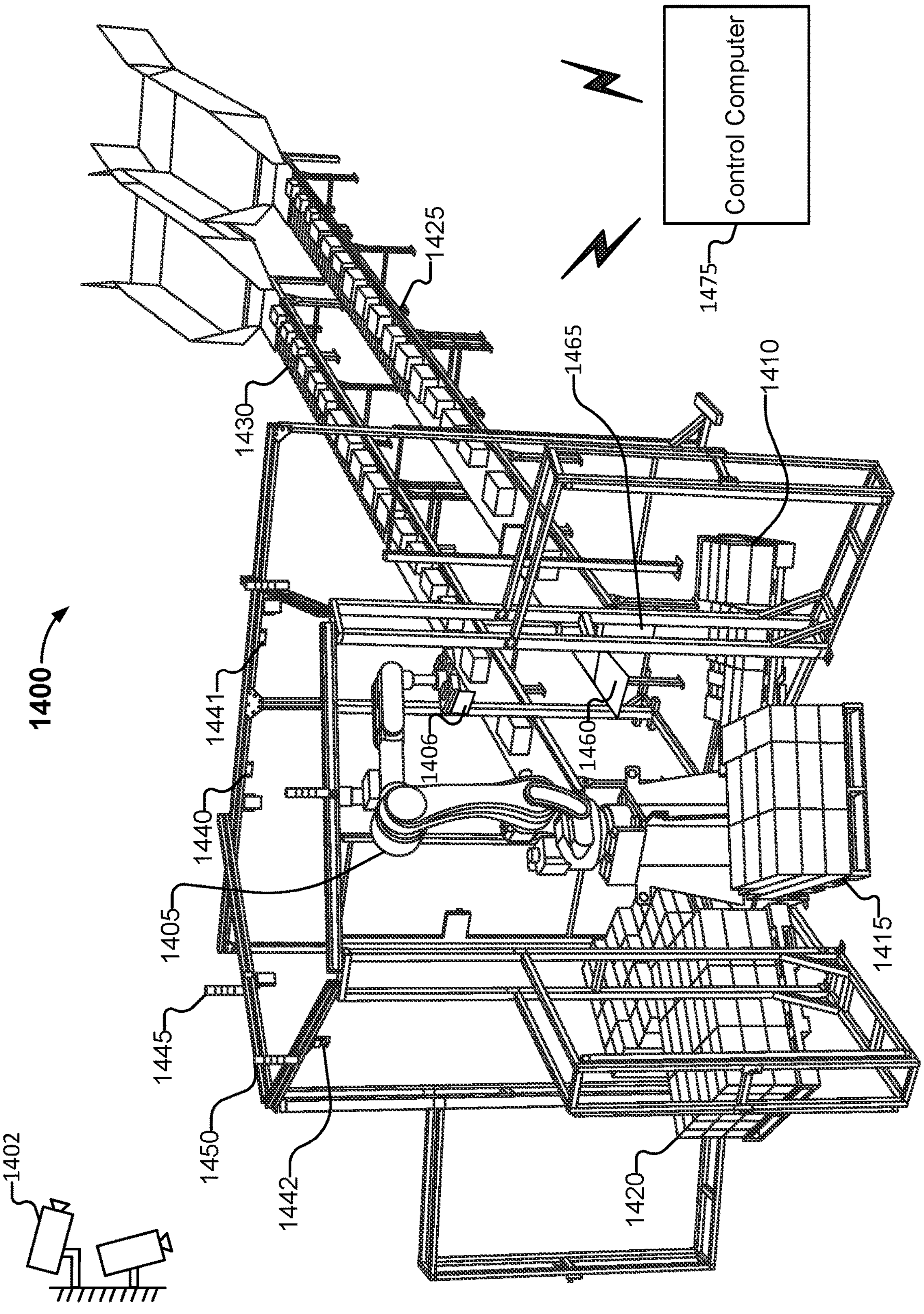
FIG. 14 is a diagram illustrating a robotic system to palletize and/or depalletize heterogeneous items according to various embodiments.

FIG. 14 is a diagram illustrating a robotic system to palletize and/or depalletize heterogeneous items according to various embodiments. In some embodiments, the robot disclosed herein uses an end effector similar to those described herein.

In the example shown, system 1400 includes a robotic arm 1405. In this example the robotic arm 1405 is stationary, but in various alternative embodiments, robotic arm 1405 may be a fully or partly mobile, e.g., mounted on a rail, fully mobile on a motorized chassis, etc. In other implementations, system 1400 may include a plurality of robotic arms with a workspace. As shown, robotic arm 1405 is used to pick arbitrary and/or dissimilar items from one or more conveyors (or other source) 1425 and 1430, and the items on a pallet (e.g., platform or other receptacle) such as pallet 1410, pallet 1415, and/or pallet 1420. In some embodiments, other robots not shown in FIG. 14 may be used to push pallet 1410, pallet 1415, and/or pallet 1420 into position to be loaded/unloaded and/or into a truck or other destination to be transported, etc.

In some embodiments, robotic arm 1405 comprises an end effector such as an end effector described herein. For example, as illustrated in FIG. 14, robotic arm 1405 comprises a robotic end effector comprising spatula 1406 (e.g., a support-type gripper). As described herein, spatula 1406 may be rigid/static or, alternatively, movable to enable robotic arm 1405 to use only a suction-type gripper on the end effector. In the implementation in which robotic arm 1405 has an end effector comprising spatula 1405 that is movable, system 1400 (e.g., control computer 1475) determines whether to deploy/extend or retract the spatula 1405 based on a selected pick type for grasping a current/next item. For example, control computer 1400 selects a pick type based on one or more of (a) a destination location at which the item is to be placed, (b) an orientation in which the item is to be placed at the destination location, (c) an item attribute, (d) a current orientation of the item, (e) the presence of other items in the workspace that occlude or otherwise restrict the robotic arm's accessibility to grasp the item at certain locations, and/or (f) a trajectory along which the item is to be moved.

As illustrated in FIG. 14, system 1400 may comprise one or more predefined zones. For example, pallet 1410, pallet 1415, and pallet 1420 are shown as located within the predefined zones. The predefined zones may be denoted by marking or labelling on the ground or otherwise structurally such as via the frame shown in system 1400. In some embodiments, the predefined zones may be located radially around robotic arm 1405. In some cases, a single pallet is inserted into a predefined zone. In other cases, one or more pallets are inserted into a predefined zone. Each of the predefined zones may be located within range of robotic arm 1405 (e.g., such that robotic arm 1405 can place items on a corresponding pallet, or de-palletize items from the corresponding pallet, etc.). In some embodiments, one of the predefined zones or pallets located within a predefined zone is used as a buffer or staging area in which items are temporarily stored (e.g., such as temporary storage until the item is to be placed on a pallet in a predefined zone).

One or more items may be provided (e.g., carried) to the workspace of robotic arm 1405 such as via conveyor 1425 and/or conveyor 1430. System 1400 may control (e.g., via control computer 1475) a speed of both conveyor 1425 and/or conveyor 1430. For example, system 1400 may control the speed of conveyor 1425 independently of the speed of conveyor 1430, or system 1400 may control the speeds of conveyor 1425 and/or conveyor 1430. In some embodiments, system 1400 may pause conveyor 1425 and/or conveyor 1430 (e.g., to allow sufficient time for robotic arm 1405 to pick and place the items). In some embodiments, conveyor 1425 and/or conveyor 1430 carry items for one or more manifests (e.g., orders). For example, conveyor 1425 and conveyor 1430 may carry items for a same manifest and/or different manifests. Similarly, one or more of the pallets/predefined zones may be associated with a particular manifest. For example, pallet 210 and pallet 1415 may be associated with a same manifest. As another example, pallet 210 and pallet 1420 may be associated with different manifests.

System 1400 may control robotic arm 1405 to pick an item from a conveyor such as conveyor 1425 or conveyor 1430, and place the item on a pallet such as pallet 1410, pallet 1415, or pallet 1420. Robotic arm 1405 may pick the item and move the item to a corresponding destination location (e.g., a location on a pallet or stack on a pallet) based at least in part on a plan associated with the item. In some embodiments, system 1400 determines the plan associated with the item such as while the item is on the conveyor, and system 1400 may update the plan upon picking up the item (e.g., based on an obtained attribute of the item such as weight, or in response to information obtained by a sensor in the workspace such as an indication of an expected collision with another item or human, etc.).

System 1400 may obtain an identifier associated with the item such as a barcode, QR code, or other identifier or information on the item. For example, system 1400 may scan/obtain the identifier as the item is carried on the conveyor, such as by capturing sensor data/image data of the workspace using vision system 1402 (e.g., the vision system 1402 may comprise one or more sensors, such as cameras). In response to obtaining the identifier, system 1400 may use the identifier in connection with determining the pallet on which the item is to be placed such as by performing a look up against a mapping of item identifier to manifests, and/or a mapping of manifests to pallets. In response to determining one or more pallets corresponding to the manifest/order to which the item belongs, system 1400 may select a pallet on which to place the item based at least in part on a model or simulation of the stack of items on the pallet and/or on a placing of the item on the pallet. System 1400 may also determine a specific location at which the item is to be placed on the selected pallet (e.g., the destination location). In addition, a plan for moving the item to the destination location may be determined, including a planned path or trajectory along which the item may be moved. In some embodiments, the plan is updated as the robotic arm 1405 is moving the item such as in connection with performing an active measure to change or adapt to a detected state or condition associated with the one or more items/objects in the workspace (e.g., to avoid an expected collision event, to account for a measured weight of the item being greater than an expected weight, to reduce shear forces on the item as the item moved, etc.).

According to various embodiments, system 1400 comprises one or more sensors and/or sensor arrays. For example, system 1400 may include one or more sensors within proximity of conveyor 1425 and/or conveyor 1430 such as sensor 1440 and/or sensor 1441. Additionally, or alternatively, system 1400 comprises vision system 1402 comprising a plurality of sensors that capture sensor data pertaining to a workspace, such as image data that can be segmented to identify items/objects within the workspace. The one or more sensors may obtain information associated with an item on the conveyor such as an identifier or information on the label of the item, or an attribute of the item such as a dimension of the item. In some embodiments, system 1400 includes one or more sensors and/or sensor arrays that obtain information pertaining to a predefined zone and/or a pallet in the zone. For example, system 1400 may include a sensor 1442 that obtains information associated with pallet 1420 or the predefined zone within which pallet 1420 is located. Sensors may include one or more 2D cameras, 3D (e.g., RGBD) cameras, infrared, and other sensors to generate a three-dimensional view of a workspace (or part of a workspace such as a pallet and stack of items on the pallet). The information pertaining to a pallet may be used in connection with determining a state of the pallet and/or a stack of items on the pallet. As an example, system 1400 may generate a model of a stack of items on a pallet based at least in part on the information pertaining to the pallet. System 1400 may in turn use the model in connection with determining a plan for placing an item on a pallet. As another example, system 1400 may determine that a stack of items is complete based at least in part on the information pertaining to the pallet.

According to various embodiments, system 1400 determines a plan for picking and placing an item (or updates the plan) based at least in part on a determination of a stability of a stack on a pallet. System 1400 may determine a model of the stack for one or more of pallets 1410, 1415, and/or 1420, and system 1400 may use the model in connection with determining the stack on which to place an item. As an example, if a next item to be moved is relatively large (e.g., such that a surface area of the item is large relative to a footprint of the pallet), then system 1400 may determine that placing the item on pallet 1410 may cause the stack thereon to become unstable (e.g., because the surface of the stack is non-planar). In contrast, system 1400 may determine that placing the relatively large (e.g., planar) item on the stack for pallet 1415 and/or pallet 1420 may result in a relatively stable stack. The top surfaces of the stacks for pallet 1415 and/or pallet 1420 are relatively planar and the placement of a relatively large item thereon may not result in the instability of the stack. System 1400 may determine that an expected stability of placing the item on pallet 1415 and/or pallet 1420 may be greater than a predetermined stability threshold, or that placement of the item on pallet 1415 or pallet 1420 may result in an optimized placement of the item (e.g., at least with respect to stability). System 1400 may further determine the plan for picking and placing an item based on the next N items being delivered to the workspace via conveyors 1425, 1430, and the availability to buffer any of the N items to allow for selection of a particular item for placement.

System 1400 may communicate a state of a pallet and/or operation of the robotic arm 1405 within a predefined zone. The state of the pallet and/or operation of the robotic arm may be communicated to a user or other human operator. For example, system 1400 may include a communication interface (not shown) via which information pertaining to the state of system 1400 (e.g., a state of a pallet, a predetermined zone, a robotic arm, etc.) is communicated to a terminal such as an on-demand teleoperation device and/or a terminal used by a human operator. As another example, system 1400 may include a status indicator within proximity of a predefined zone, such as status indicator 1445 and/or status indicator 1450.

Status indicator 1450 may be used in connection with communicating a state of a pallet and/or operation of the robotic arm 1405 within the corresponding predefined zone. For example, if system 1400 is active with respect to the predefined zone in which pallet 1420 is located, the status indicator can so indicate such as via turning on a green-colored light or otherwise communicating information or an indication of the active status via status indicator 1450. System 1400 may be determined to be in an active state with respect to a predefined zone in response to determining that robotic arm 1405 is actively palletizing one or more items on the pallet within the predefined zone. As another example, if system 1400 is inactive with respect to the predefined zone in which pallet 1420 is located, the status indicator can so indicate such as via turning on a red-colored light or otherwise communicating information or an indication of the active status via status indicator 1450. System 1400 may be determined to be inactive in response to a determination that robotic arm 1405 is not actively palletizing one or more items on the pallet within the predefined zone, for example, in response to a user pausing that predefined zone (or cell), or in response to a determination that a palletization of items on pallet 1420 is complete. A human operator or user may use the status indicator as an indication as to whether entering the corresponding predefined zone is safe. For example, a user working to remove completed pallets, or inserting empty pallets, to/from the corresponding predefined zone may refer to the corresponding status indicator and ensure to enter the predefined zone when the status indicator indicates that operation within the predefined zone is inactive.

According to various embodiments, system 1400 may use information obtained by one or more sensors within the workspace to determine an abnormal state pertaining to the pallet and/or items stacked on the pallet. For example, system 1400 may determine that a pallet is misaligned relative to robotic arm 205 and/or the corresponding predefined zone based at least in part on the information obtained by the sensor(s). As another example, system 1400 may determine that a stack is unstable, that items on a pallet are experiencing a turbulent flow, etc. based at least in part on the information obtained by the sensor(s). In response to detecting the abnormal state, system 1400 may communicate an indication of the abnormal state such as to an on-demand teleoperation device or other terminal used by an operator. In some embodiments, in response to detecting the abnormal state, system 1400 may automatically set the pallet and/or corresponding zone to an inactive state. In addition to, or as an alternative to, notifying an operator of the abnormal state, system 1400 may perform an active measure. The active measure may include controlling the robotic arm 1405 to at least partially correct the abnormal state (e.g., restack fallen items, realign the pallet, etc.). In some implementations, in response to detecting that an inserted pallet is misaligned (e.g., incorrectly inserted to the predefined zone), system 1400 may calibrate the process for modelling a stack and/or for placing items on the pallet to correct for the misalignment. For example, system 1400 may generate and use an offset corresponding to the misalignment when determining and implementing a plan for placing an item on the pallet. In some embodiments, system 1400 performs the active measure to partially correct the abnormal state in response to determining that an extent of the abnormality is less than a threshold value. Examples of determining that an extent of the abnormality is less than a threshold value include (i) a determination that the misalignment of the pallet is less than a threshold misalignment value, (ii) a determination that a number of dislodged, misplaced, or fallen items is less than a threshold number, (iii) a determination that a size of a dislodged, misplaced, or fallen item satisfies a size threshold, etc.

A human operator may communicate with system 1400 via a network such as a wired network and/or a wireless network. For example, system 1400 may comprise a communication interface via which system 1400 is connected to one or more networks. In some embodiments, a terminal connected via network to system 1400 provides a user interface via which a human operator can provide instructions to system 1400, and/or via which the human operator may obtain information pertaining to a state of system 1400 (e.g., a state of the robotic arm, a state of a particular pallet, a state of a palletization process for a particular manifest, etc.). The human operator may provide an instruction to system 1400 via an input to the user interface. For example, a human operator may use the user interface to pause the robotic arm, pause a palletization process with respect to a particular manifest, pause a palletization process for a particular pallet, toggle a status of a pallet/predefined zone between active/inactive, etc.

In various embodiments, elements of system 1400 may be added, removed, swapped out, etc. In such an instance, a control computer initializes and registers the new element, performs operational tests, and begins/resumes kitting operations, incorporating the newly added element, for example.

According to various embodiments, system 1400 determines (e.g., computes, maintains, stores, etc.) an estimated state for each pallet in the plurality of zones (e.g., pallet 1410, pallet 1415, and/or pallet 1420), or an aggregated estimated state for the set of pallets among the plurality of zones, or both individual estimated states and an aggregated estimated state. The accuracy of the estimated and aggregated estimated states may be improved based on the use of an end effector comprising a support structure to support the bottom of an item being grasped by the end effector, thus reducing the deformation of the item while being carried by the robotic arm 1405.

According to various embodiments, system 1400 comprises a vision system comprising one or more sensors (e.g., sensor 1440, sensor 1441, vision system 1402, etc.). In various embodiments, system 1400 uses sensor data and geometric data (e.g., a geometric model) in connection with determining a location at which to place one or more items on a pallet (or in connection with depalletizing one or more items from a pallet). System 1400 uses different data sources to model the state of a pallet (or a stack of items on a pallet). For example, system 1400 estimates locations of one or more items on the pallet(s) and one or more characteristics (or attributes) associated with the one or more items (e.g., a size of the item(s)). The one or more characteristics associated with the one or more items may include an item size (e.g., dimensions of the item), a center of gravity, a rigidity of the item, a type of packaging, a location of an identifier, etc.

System 1400 (e.g., control computer 1475) determines the geometric model based at least in part on one or more attributes for one or more items in the workspace. For example, the geometric model reflects respective attributes of a set of items (e.g., one or more of a first set that are palletized/stacked, and a second set of items that is to be palletized/stacked, etc.). Examples of attributes for an item include an item size (e.g., dimensions of the item), a center of gravity, a rigidity of the item, a type of packaging, a location of an identifier, a deformability of the item, a shape of the item, etc. Various other attributes of an item or object within the workspace may be implemented.

The model generated by system 1400 can correspond to, or be based at least in part on, a geometric model. In some embodiments, system 1400 generates the geometric model based at least in part on one or more items that have been placed (e.g., items for which system 1400 controlled robotic arm 1405 to place), one or more attributes respectively associated with at least a subset of the one or more items, one or more objects within the workspace (e.g., predetermined objects such as a pallet, a robotic arm(s), a shelf system, a chute, or other infrastructure comprised in the workspace). The geometric model can be determined based at least in part on running a physics engine implemented by control computer 1475 to model a stacking or placing of items (e.g., models a state/stability of a stack of items, etc.). The geometric model can be determined based on an expected interaction of various components of the workspace, such as an item with another item, an object, a simulated force applied to the stack (e.g., to model the use of a forklift or other device to raise/move a pallet or other receptacle on which a stack of items is located).

According to various embodiments, system 1400 uses the geometric model and the sensor data to determine a best estimate of a state of the workspace. System 1400 can adjust for (e.g., cancel) noise in one or more of the geometric model and/or sensor data. In some embodiments, system 1400 detects anomalies or differences between a state according to the geometric model and a state according to the sensor data. In response to determining an anomaly or difference between the geometric model and the sensor data, system 1400 can make a best estimate of the state notwithstanding the anomaly or difference. For example, system 1400 determines whether to use the geometric model or the sensor data, or a combination of (e.g., an interpolation between) the geometric model and the sensor data, etc. In some embodiments, system 1400 determines the estimated state on a segment-by-segment basis (e.g., a voxel-by-voxel basis in the workspace, an item-by-item basis, or an object-by-object basis, etc.). For example, a first part of the workspace may be estimated using only the geometric model, a second part of the workspace may be estimated using only the sensor data (e.g., in the event of an anomaly in the geometric model), and/or a third part of the workspace may be estimated based on a combination of the geometric model and the sensor data. Using the example illustrated in FIG. 14, in connection with determining an aggregated estimated state, system 1400 may use only the geometric model to determine the individual estimated state for the stack of items on pallet 1410, use only sensor data to determine the individual estimated state for the stack of items on pallet 1415, and use a combination of the respective geometric model and sensor data for the stack of items on pallet 1420.

The estimated state obtained by system 1400 may reflect the expected noise generated in connection with picking and placing items. For example, the geometric model is updated to account for the expected noise. The updating the geometric model to account for the expected noise can include adjusting the geometric model to include imprecision in the placement of the item as a result of expected noise. The updating the geometric model to account for the expected noise can include adjusting the geometric model to resolve noise comprised in the sensor data such as voids occurring as a result of a blocking of the field of view, or distortions generated by the camera at edges of field of views in the vision system.

According to various embodiments, system 1400 models noise (e.g., noise comprised in sensor data, or noise corresponding to differences between a geometric model and the sensor data). The modelling of noise in connection with determining an estimated state can provide a better final estimate of the state of the system (e.g., a more accurate/precise estimated state). In some embodiments, system 1400 estimates a type/extent of noise (e.g., point cloud noise) corresponding to a destination location at which a particular item is geometrically placed (e.g., where the system assumes the object is placed/to be placed in an idealized state). In some embodiments, the modelling of the noise includes performing a machine learning process to train a noise profile (e.g., a noise model).

Various simulations performed with respect to determining an estimated state or a plan for moving a set of items (e.g., a plan to palletize a set of items) include varying a state estimation model. Varying the state estimation model can include varying a stacking model according to which the set of items are moved. In some embodiments, varying the stacking model may include varying one or more of an order in which the set of items are moved, a location of one or more of the set of items, an orientation of the one or more set of items, a noise profile used in modelling placement of the set of items, etc. Varying the state estimation model can include varying settings or configurations of the model. In some embodiments, varying settings or configurations includes varying a cost function, one or more thresholds used in connection with modelling a set of items such as a stack of items (e.g., a stability threshold, a time threshold, a bias for placing items with certain attributes in certain locations (e.g., placing larger items at a bottom of a stack of items), a range of acceptable locations or orientations for certain items (e.g., a defined set of locations or orientations according to which items having certain attribute(s) are permitted to be placed), etc.).

According to various embodiments, performing simulations to determine the state estimation model, or the estimated state, includes simulating movement of a set of items according to a set of different item ordering in which items are moved. For example, the system performs a first simulation of stacking a set of items according to a first order in which the set of items are stacked, and the system performs a second simulation of stacking the set of items according to a second order in which the set of items are stacked, etc.

According to various embodiments, the simulations performed to determine the state estimation model, or the estimated state, includes simulating movement of a set of items according to a set of different locations and/or orientations for which the items are moved. For example, the system performs a first simulation of stacking a set of items at a corresponding first set of item locations and/or orientations, and the system performs a second simulation of stacking a set of items at a corresponding second set of item locations and/or orientations, etc.

According to various embodiments, the simulating the state estimation model include varying one or more environmental factors. Examples of environmental factors that are varied/simulated during the simulations includes dust, glare from items or other objects in the workspace, humidity, number of pallets on which items may be stacked, etc.

Although the foregoing example is discussed in the context of a system palletizing a set of items on one or more pallets, the robotic system can also be used in connection with depalletizing a set of items from one or more pallets.

In some embodiments, the system determines a state estimation model based at least in part on the simulations (e.g., the set of state estimation models generated via the simulation). The state estimation model used by the system to determine an estimated state may correspond to one of the state estimation models generated via the simulations, or may be determined based on a combination of two more of the state estimation models generated via the simulations.

In some embodiments, the system evaluates the state estimation models generated via the simulations and uses results of the evaluation to determine one or more characteristics or configurations that yields a best result. As an example, the best result corresponds to a set of characteristics or configurations that provide a quickest estimation of the state given the noise data. As another example, the best result corresponds to a state estimation that is most accurate (e.g., as determined based on empirical trials). In some embodiments, the state estimation model that yields the best result is determined based on a value for a cost function applied with respect to the set of state estimation models generated via the simulations. For example, the state estimation model yielding the best result (e.g., the best state estimation model) is a state estimation model for which a value of the cost function is lowest. The cost function can be based at least in part on one or more of an accuracy, a time for providing an estimation (e.g., the amount of time the state estimation model requires to provide an estimated state), a number of factors considered in the state estimation model, an inclusion or exclusion of one or more predefined factors, etc. Various other variables may be implemented in the cost function.

In the example shown, system 1400 comprises panels 1460 and 1465 at the distal end of conveyor 1475. As described with respect to support panels or flaps 610, 612 of FIG. 6, panels 1460 and 1465 are movable, such as via control using control computer 1475. As illustrated, panel 1460 is deployed/extended and panel 1465 is retracted. System 1400 controls to retract panel 1465 and deploy panel 1460 based on a strategy for grasping a next item. For example, system 1400 may determine the plan to grasp the item using spatula 1460 to support the bottom of a next item being delivered by conveyor 1425 where spatula 1460 will be oriented/positioned in the area from which panel 1465 has been moved/retracted. In some embodiments, system 1400 (e.g., control computer 1475) controls panels 1460, 1465 based on one or more of an item to be grasped from conveyor 1425, a pick type, a strategy for grasping the item, a timing (or expected timing) for delivery of the item to be grasped to the pickup zone at panel 1460.

In some embodiments, control computer 1475 controls various components of system 1400 in coordination to implement a placement. For example, control computer 1475 controls conveyors 1425 and 1430 to deliver items to the workspace in accordance with a determined timing, determines a placement and strategy/plan for the placement of an item within the workspace, controls robotic arm 1405 to move to grasp the item from the conveyors 1425 and 1430 in accordance with the strategy/plan for performing the placement (e.g., for grasping the item), and then controls robotic arm (e.g., the end effector) to grasp the item and move the item to the destination location. Control computer 1475 may control the timing for controlling the various components in system 1400 to perform the plan for placing item(s).

Figure 15:
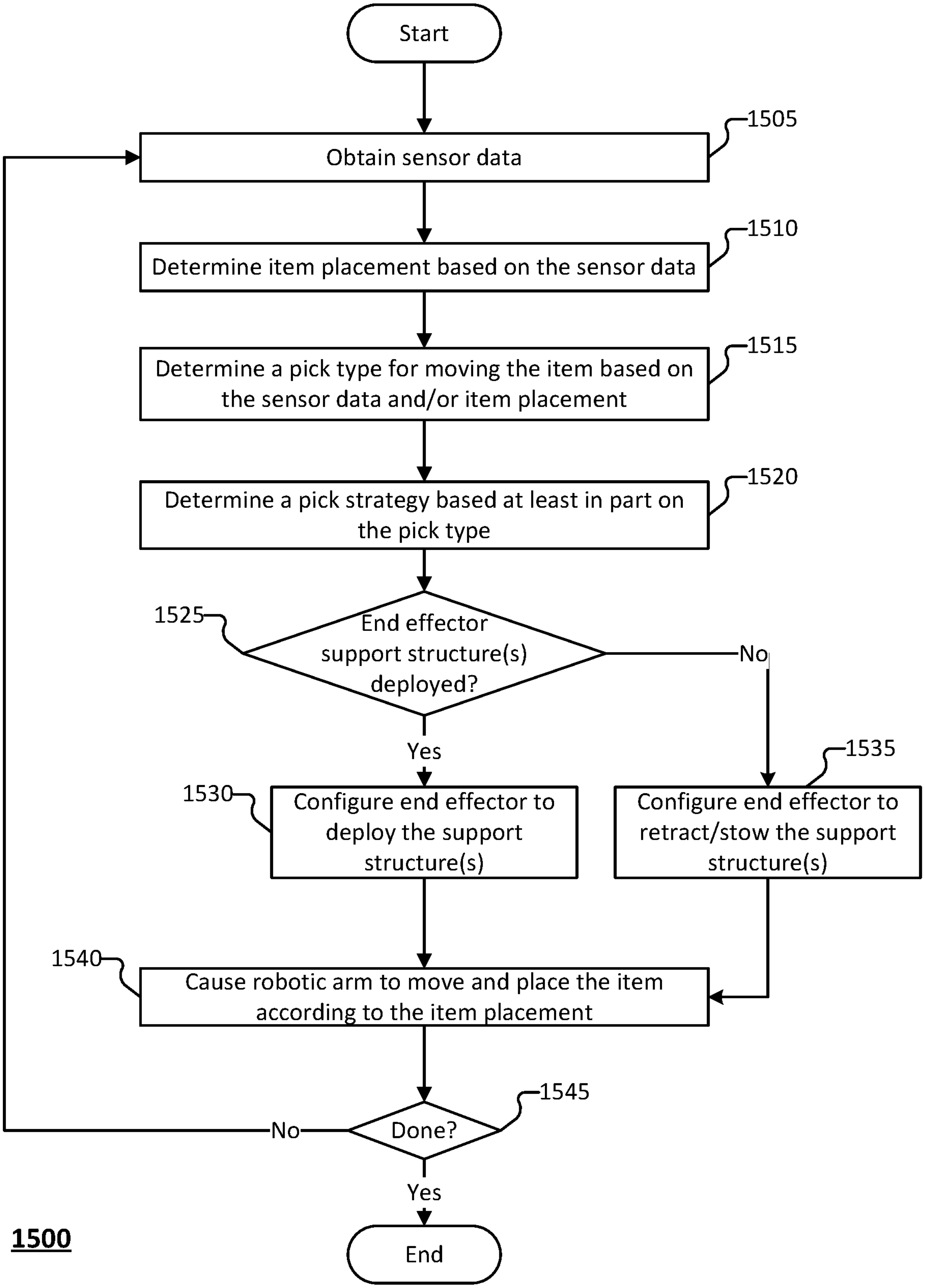
FIG. 15 illustrates an example of a method for determining a strategy for grasping an item according to various embodiments.

FIG. 15 illustrates an example of a method for determining a strategy for grasping an item according to various embodiments. In some embodiments, the system implements process 1500 in connection with performing a placement of an item using an end effector comprising a moveable support structure similar to those described herein.

At 1505, the system obtains sensor data. For example, the system obtains the sensor data from a vision system. The system may generate a model of the workspace based on the sensor data. At 1510, the system determines an item placement based at least in part on the sensor data. For example, the system uses the model to determine a placement for a next item. The placement may be determined based on a scoring or cost function, which may include certain constraints such as workspace boundaries, expected stability of the item or stack of items after placement, item attributes, objects or other placed items in the workspace, etc. At 1515, the system determines a pick type for moving the item based at least in part on the sensor data and/or the item placement. As an example, the system determines an optimal pick type (e.g., according to a predetermined scoring function) for picking and placing the item. The pick type may be based on one or more of an item attribute (e.g., size, shape, weight, etc.), an item orientation, an orientation in which the item is to be placed, a placement location (e.g., the presence of other items that may obstruct the end effector during placement), etc. For example, the system selects a most efficient pick type for performing the placement, which may be further subject to a likelihood of success constraint. At 1520, the system determines the pick strategy based at least in part on the pick type. For example, the system determines how the robotic arm is to be controlled to orient/configure the end effector to grasp the item in its current orientation. At 1525, the system determines whether the pick strategy includes using the end effector with one or more support structures deployed. In response to determining that the end effector is to be used with a support structure deployed, process 1500 proceeds to 1530 at which the system configures the end effector to deploy (or maintain deployment) of the support structure(s). Conversely, in response to determining that the end effector is to be used without a support structure deployed, process 1500 proceeds to 1535 at which the system configures the end effector to retract or stow the support structure. At 1540, the system causes the robotic arm to move and place the item according to the item placement.

At 1545, a determination is made as to whether process 1500 is complete. In some embodiments, process 1500 is determined to be complete in response to a determination that no further items are to be placed, the current item was successfully placed, the user has exited the system, an administrator indicates that process 1500 is to be paused or stopped, etc. In response to a determination that process 1500 is complete, process 1500 ends. In response to a determination that process 1500 is not complete, process 1500 returns to 1505.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic end effector, comprising:

an end effector body having an operative side;

a pull force gripper disposed on the operative side of the end effector body; and a first end effector support structure that is connected to the end effector body and extends from the end effector body in a direction that is orthogonal to the operative side of the end effector body, wherein:

the first end effector support structure is controlled to be toggled between a deployed configuration and a retracted configuration based on a selected pick type for engaging a particular item; and a controller determines whether the selected pick type requires use of the support structure and, in response to the determination, controls the end effector to deploy the first end effector support structure when the pick type requires bottom support and to retract the first end effector support structure when the pick type does not require bottom support.

2. The end effector of claim 1, wherein:

the controller deems a particular item surface to be a bottom surface based at least in part on a normalized side labelling convention; and the first end effector support structure is disposed to provide support to an item grasped by the end effector by applying an upwards force on the bottom surface of the item when the item is grasped on a side substantially orthogonal to the bottom surface.

3. The end effector of claim 1, wherein:
the controller deems a particular item surface to be a bottom surface based at least in part on a normalized side labelling convention; and
the first end effector support structure comprises a surface configured to facilitate sliding insertion of the first end effector support structure under the item that engages the bottom surface of an item when being grasped by the end effector.

4. The end effector of claim 1, further comprising:
a second end effector support structure that is connected to the end effector body and extends from the end effector body in a direction that is orthogonal to both the operative side and a direction in which the first end effector support structure extends from the operative side.

5. The end effector of claim 1, wherein;
the controller deems a particular item surface to be a bottom surface based at least in part on a normalized side labelling convention; and
the end effector is controlled to:
engage an item on a side surface with the pull force gripper and engage the item on an orthogonal side surface with the first end effector support structure; and
apply a rotational force to cause the item to rotate in a manner so that the orthogonal side surface engaged with the first end effector support structure corresponds to the bottom surface of the item.

6. The end effector of claim 1, wherein:
the end effector is controlled to apply a rotational force to an item when the end effector is being controlled to perform a place operation; and
the rotational force causing the item to rotate to be placed in a placement orientation that is different from a movement orientation in which the item is moved by a robotic arm while grasped by the end effector.

7. The end effector of claim 1, wherein the first end effector support structure is rotatably connected to the end effector body, and the end effector comprises a support structure actuator that causes the first end effector support structure to move the first end effector support structure to grasp an item according to a predetermined plan.

8. The end effector of claim 1, further comprising one or more second end effector support structures connected to the end effector body and movable to engage different parts of an item.

9. The end effector of claim 1, wherein:
the first end effector support structure is movable between a deployed position in which it extends orthogonally from the operative side of the end effector body and a retracted stowed position; and
the end effector further comprises a support structure actuator configured to selectively move the first end effector support structure between the deployed position and the retracted stowed position to enable the pull force gripper to perform a top-down grasp on an item without interference from the first end effector support structure.

10. A robotic system for moving items, comprising:
a robotic arm comprising an end effector, the end effector comprising:
an end effector body having an operative side;
a pull force gripper disposed on the operative side of the end effector body; and
a support structure that is connected to the end effector body and extends from the end effector body in a direction that is orthogonal to the operative side of the end effector body; and
a processor configured to:
receive an indication of an item to be moved;
determine a plan to move the item with the robotic arm; and
determine a particular item surface to deem as a bottom surface of the item based at least in part on a normalized side labelling convention;
cause the robotic arm to move the item according to the plan, the plan including grasping the item on a side surface with the pull force gripper and engaging a surface identified as the bottom surface of the item with the support structure, wherein causing the robotic arm to move the item according to the plan comprises determining whether a selected pick type requires use of the support structure and, in response to the determination, controlling the end effector to deploy the support structure when the pick type requires bottom support and to retract the support structure when the pick type does not require bottom support; and
a memory configured to store the plan.

11. The robotic system of claim 10, further comprising a communication interface configured to receive, from one or more sensors deployed in a workspace, sensor data indicative of a current state of the workspace, the workspace comprising one or more items to be moved by the robotic arm.

12. The robotic system of claim 10, wherein the processor are further configured to:
identify the item within a workspace of the robotic system; and
determine the side surface of the item on which the pull force gripper is to grasp the item.

13. The robotic system of claim 12, wherein the side surface and the bottom surface are determined based at least in part on a labelling of item sides based on a normalized labelling process.

14. The robotic system of claim 13, wherein the normalized labelling process ensures that an item side facing a certain direction is consistently labeled with a corresponding side label.

15. The robotic system of claim 10, wherein determining the plan to move the item comprises determining a pick type to be implemented to grasp the item.

16. The robotic system of claim 15, wherein the pick type comprises one of:
(a) a front-on pick type according to which the pull force gripper engages the item on a front surface and the support structure supports the bottom surface;
(b) a side-on pick type according to which the pull force gripper engages the item on a side surface that is orthogonal to a direction the item is moving along a conveyance structure and the support structure supports the bottom surface;
(c) a front-on belt flip pick type according to which (i) the pull force gripper is controlled to engage the item on a top surface and the support structure engages an orthogonal side surface, and (ii) the end effector is controlled to apply a rotational force to cause the item to rotate in a manner so that upon completion of item rotation, the top surface engaged by the pull force gripper corresponds to a front surface and the orthogonal side surface supported by the support structure corresponds to the bottom surface; and (d) a side on-belt flip type according to which (i) the pull force gripper is controlled to engage the item on a top surface and the support structure engages an orthogonal side surface, and (ii) the end effector is controlled to apply a rotational force to cause the item to rotate in a manner so that upon completion of item rotation, the top surface engaged by the pull force gripper corresponds to a side surface that is parallel with a direction the item is moved along a conveyance structure and the orthogonal side surface supported by the support structure corresponds to the bottom surface.

17. The robotic system of claim 10, further comprising:

a conveyance structure comprising:

a belt that is controlled to move the item within a workspace to an item pickup zone; and one or more conveyance support structures disposed at the item pickup zone, wherein the one or more conveyance support structure provide support for the item while the end effector is controlled to grasp the item.

18. The robotic system of claim 17, wherein the one or more conveyance support structures are configured to rotate around an axis that is substantially parallel with a width of the belt.

19. The robotic system of claim 18, wherein:

the one or more conveyance support structures comprises a first conveyance support structure and a second conveyance support structure; and the first conveyance support structure and the second conveyance support rotate around the axis independently.

20. The robotic system of claim 19, wherein during a pick operation:

the belt is controlled to move the item to the pickup zone at which at least one of the first conveyance support structure and the second conveyance support structure is extended;

the end effector is controlled to grasp the item on a side surface with the pull force gripper and engage the bottom surface of the item with the support structure; and at least one of the first conveyance support structure and the second conveyance support structure is configured in a retracted position when the end effector is positioned to engage the bottom surface of the item with the support structure.

21. The robotic system of claim 17, wherein the processor is further configured to control the one or more conveyance support structures to retract at least one conveyance support structure to provide clearance for the end effector support structure to engage the bottom surface of the item while the item is still supported by at least one other conveyance support structure.

22. The robotic system of claim 10, wherein:

the robotic system comprises a second robotic arm; and causing the robotic arm to move the item according to the plan includes collaboratively controlling the robotic arm and the second robotic arm to grasp the item at different locations and to collaboratively move the item along a predetermined path.

23. A robotic system for moving items, comprising:

a robotic arm comprising an end effector, the end effector comprising:

an end effector body having an operative side;

a pull force gripper disposed on the operative side of the end effector body; and a support structure that is connected to the end effector body and extends from the end effector body in a direction that is orthogonal to the operative side of the end effector body;

a conveyance structure comprising:

a belt that is controlled to move the item within a workspace to an item pickup zone; and one or more conveyance support structures disposed at the item pickup zone, wherein the one or more conveyance support structure provide support for the item while the end effector is controlled to grasp the item;

a processor configured to:

receive an indication of an item to be moved;

determine a plan to move the item with the robotic arm; and determine a particular item surface to deem as a bottom surface of the item based at least in part on a normalized side labelling convention;

cause the robotic arm to move the item according to the plan, the plan including grasping the item on a side surface with the pull force gripper and engaging the bottom surface with the support structure, wherein causing the robotic arm to move the item comprises controlling the one or more conveyance support structures to retract at least one conveyance support structure to provide clearance for the end effector support structure to engage the bottom surface of the item while the item is still supported by at least one other conveyance support structure; and a memory configured to store the plan.

* * * * *